United States Patent [19]

Postman et al.

[11] Patent Number: 5,664,231
[45] Date of Patent: Sep. 2, 1997

[54] PCMCIA INTERFACE CARD FOR COUPLING INPUT DEVICES SUCH AS BARCODE SCANNING ENGINES TO PERSONAL DIGITAL ASSISTANTS AND PALMTOP COMPUTERS

[75] Inventors: Joel Robert Postman, Santa Clara; David Peter Bergen, Mountain View; Ronald Craig Fish, Morgan Hill, all of Calif.

[73] Assignee: TPS Electronics, Palo Alto, Calif.

[21] Appl. No.: 236,630

[22] Filed: Apr. 29, 1994

[51] Int. Cl.⁶ .................. G06K 7/10; G06K 3/00; G06K 3/05
[52] U.S. Cl. .............. 395/893; 235/472; 235/462; 235/463
[58] Field of Search ............... 395/725, 893; 235/462, 463, 472, 492

[56] References Cited

U.S. PATENT DOCUMENTS

| | | | |
|---|---|---|---|
| 4,323,772 | 4/1982 | Serge | 235/463 |
| 4,621,189 | 11/1986 | Kumar et al. | 235/472 |
| 4,873,426 | 10/1989 | Sarna et al. | 235/462 |
| 4,948,955 | 8/1990 | Lee et al. | 235/462 |
| 5,155,343 | 10/1992 | Chandler et al. | 235/462 |
| 5,196,685 | 3/1993 | Izumi | 235/462 |
| 5,216,231 | 6/1993 | Ouchi | 235/463 |
| 5,245,167 | 9/1993 | Takenaka | 235/462 |
| 5,287,456 | 2/1994 | Rhodes et al. | 395/200 |
| 5,369,264 | 11/1994 | Rosa et al. | 235/462 |
| 5,468,952 | 11/1995 | Alexander et al. | 235/492 |

OTHER PUBLICATIONS

Rose, "PCMCIA", Jun. 1993, pp. 1–6.
"NPD/Nielsen Reshapes the Future of Home Based Market Research" *Real Times* vol. 3, No. 2, 1991.
"PTCs Speed POS Conversions of Woolworth Corporation"; *Real Times*, vol. 3 no. 2 1991.
Telxon PTC–860RF & Telxon PTC–600.
"Advertisement for Symbol PPT 4110", *Automatic ID News*, May 1994.

Primary Examiner—Thomas C. Lee
Assistant Examiner—D. Dinh
Attorney, Agent, or Firm—Ron Fish; Falk & Fish

[57] ABSTRACT

There is disclosed a variety of PC Card interfaces to interface from many different types of input devices to Personal Digital Assistants or palmtop computers through PCMCIA slots.

The disclosed interfaces can receive data in undecoded format from laser based, wand based or CCD based barcode scanning engines, decode the data to alphanumeric characters and pass the decoded data to the PDA via the PCMCIA 68 pin bus. Other PC Card based interfaces are also disclosed which can accept input data in the form of ASCII or EBCDIC characters from virtually any type of input device which a standard serial or parallel output or custom output bus and input that data to the PDA through the PCMCIA bus.

46 Claims, 15 Drawing Sheets

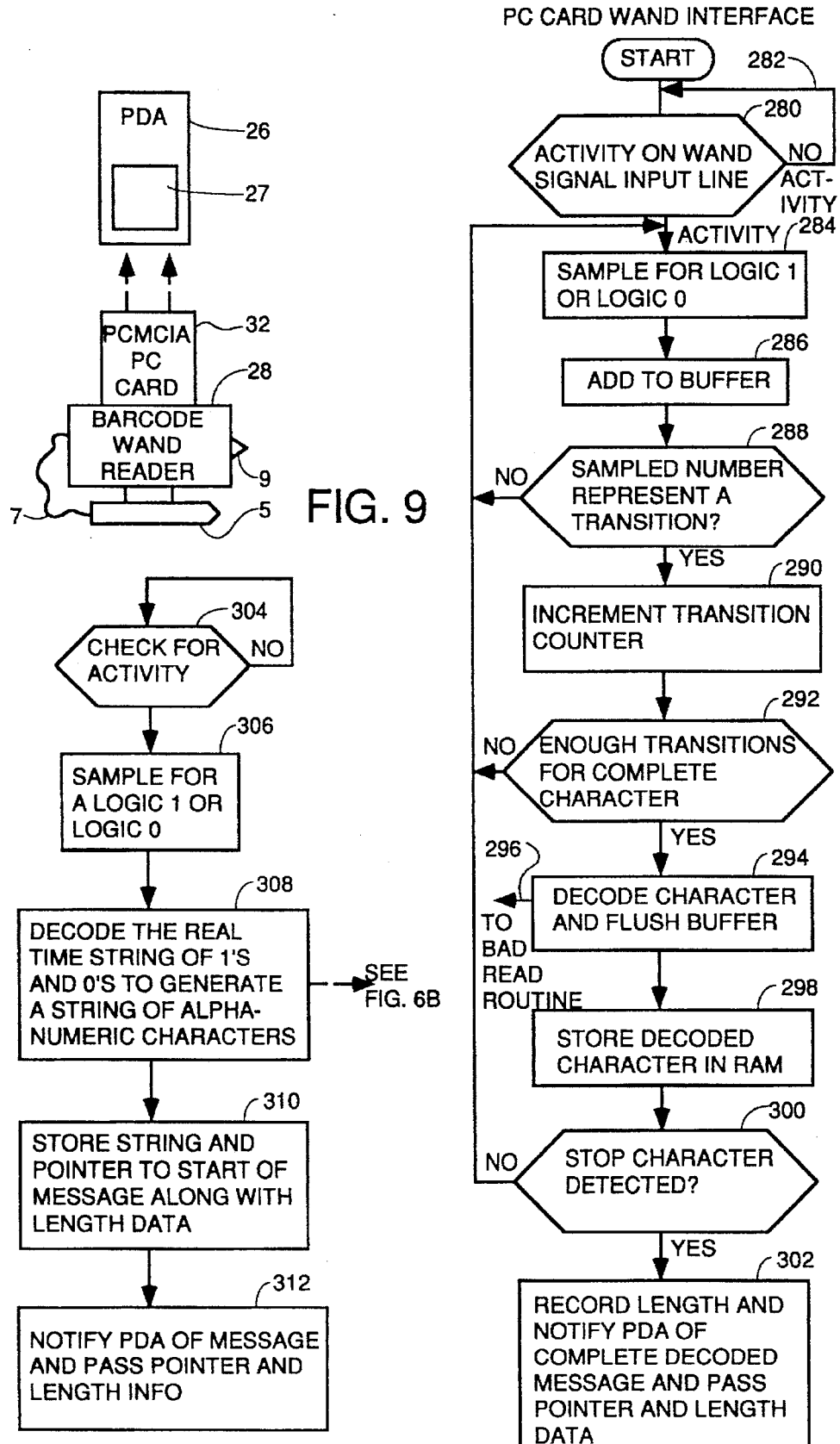

PCMCIA INTERFACE CARD FOR COUPLING INPUT DEVICES SUCH AS BARCODE SCANNING ENGINES TO PERSONAL DIGITAL ASSISTANTS AND PALMTOP COMPUTERS

BACKGROUND OF THE INVENTION

The invention pertains to the field of input devices for handheld computers in general, and to PCMCIA defined PC Card interfaces between barcode scanning devices and other input devices and portable computers in particular.

Barcodes are patterns of light and dark spaces, usually arranged as a series of parallel bars of varying width and having variable width white spaces between the bars. The pattern of light and dark spaces and ratios of light to dark spaces over the length of the barcode encode therein a series of alphanumeric characters. Barcodes are widely used on products to encode the product description etc. in, for example, supermarkets and departments stores. Items to be purchased or inventoried have their barcodes scanned by laser or charge coupled device barcode scanning engines which are coupled to host computers. The pattern of light and dark spaces detected by the barcode scanning engine is converted to an electrical signal having a unique pattern dictated by the pattern of light and dark spaces. This electrical signal is decoded and converted to the alphanumeric string encoded in the barcode either by the host computer or by the barcode scanning engine. The alphanumeric string either directly or indirectly specifies the product description and price in most applications and may specify other information.

Portable barcode scanning systems are useful for many applications such as inventory control. Portable barcode scanning systems exist in the prior art and are commercially available from such vendors as Symbol Technologies, Inc. of Bohemia, New York and Telxon. To date however portable barcode scanners have been custom units of proprietary design. An example of a custom designed, proprietary portable barcode scanning system is the model PTC-600 available from Telxon. This device uses a custom designed portable computer to which is attached a clip-on barcode scanning engine. This technology is described in more detail in U.S. Pat. No. 4,621,189, the teachings of which are incorporated by reference. However the process of decoding barcodes is well known and can be done by any suitably programmed computer having appropriate interface circuitry so there is no need to buy a custom designed computer system simply to do one type of task when a general purpose computer with suitable peripheral circuitry and software can do the same task as well as other tasks. Further, there is a disadvantage to the consumer in that as better barcode scanning engines or better computers become available, the consumer is precluded from using them in a custom designed system unless he or she is willing to give up their investment in the custom designed system already purchased.

With the introduction of palmtop computers, Personal Communicators such as the AT&T EO and Personal Digital Assistants (hereafter PDA's) there has arisen a need to modify these general purpose devices for use with various input devices such as barcode scanning engines to create "open system" non-proprietary portable barcode scanning apparati.

Therefore, there is described herein an open system interface for various input devices such as bar code scanners, magnetic stripe readers etc. which can be integrated onto a PCMCIA defined PC Card.

SUMMARY OF THE INVENTION

The teachings of the invention contemplate a genus of interfaces for portable laser-scanning, charge coupled device and wand type barcode scanning engines, magnetic stripe and magnetic ink readers, keyboards or 10-key keypads, optical character recognition devices, and trackballs using PCMCIA defined PC Cards to interface these devices with host PDA's or palmtop computers. PC Cards are small removable peripheral devices for portable computers which are roughly the size of a credit card (2.126"×3.37") but have different thicknesses. A type I card has a thickness of approximately 3.3 millimeters (mm) while Type II and Type III cards have thicknesses of 5 mm and 10.5 mm, respectively. The PCMCIA "PC Card" standards incorporated by reference herein cover physical dimensions, pin assignments, electrical specifications, protocols and file formats. PC Cards interface with 8 and 16 bit buses and support physical access to up to 64 megabytes of memory.

The advantages of implementing interfaces for frequently used input devices on industry standard PC Cards are plentiful. First and foremost is the fact that such an "open system" combination gives the user the advantage of not being locked into a proprietary technology that can become obsolete in a matter of months in the fast moving world of high tech electronics. What this means to a user is that when a better PDA or palmtop computer comes out, the user does not have to buy all new input devices designed specifically to work only with that computer as long as the new computer has an industry standard PC Card slot. Thus, if the manufacturer of the new computer does not offer a proprietary CCD or laser based barcode scanner, the user is not precluded from using such an input device as long as the new computer has a PC Card slot. Likewise, when a new input device with better features appears on the market, the user is not precluded from switching to the new input device for use with his or her existing PDA so long as he or she has a PC Card implementing an appropriate interface for the new input device to convert the output of the new input device to signals on 68 pin bus defined by PCMCIA standards accepted industry wide.

In the preferred embodiment of the interface for a laser type barcode scanning engine, the PCMCIA defined PC Card has attached thereto a housing which contains a visible light laser diode, scanning optics and a photodetector. The scanning optics scan a laser beam across a barcode and detect reflected light. In some embodiments, the PCMCIA defined PC Card has circuitry integrated thereon to sample the analog signal from the photodetector and create a digital image thereof in memory and decode the digital image in memory into an ASCII or EBCDIC charater string representing the alphanumeric text encoded into the barcode (ASCII or EBCDIC are industry standard codes that define for each alphanumeric character a unique string of 1's and 0's that are a binary code for that character). In addition there is circuitry integrated on the PCMCIA defined PC Card to send the decoded data from the photodetector to the host PDA for use by an application program in execution thereon.

In some embodiments, the PC Card interface contains circuitry to transmit the decoded data to a host mainframe or other computer via a wireless LAN connection implemented with infrared or through RF packet transmission.

BRIEF DESCRIPTION OF THE DRAWINGS

FIG. 9 is a diagram of a PC Card interface with integrated wand type barcode reader.

FIG. 10 is a flow chart of the software process executed by the PC Card to decode undecoded serial data from a wand type barcode reader "on the fly".

FIG. 11 is a flow chart of the software process executed by the PC Card to decode undecoded serial data from a wand type barcode reader "on the fly" without counting transitions.

DETAILED DESCRIPTION OF THE PREFERRED EMBODIMENT

Figure 1:
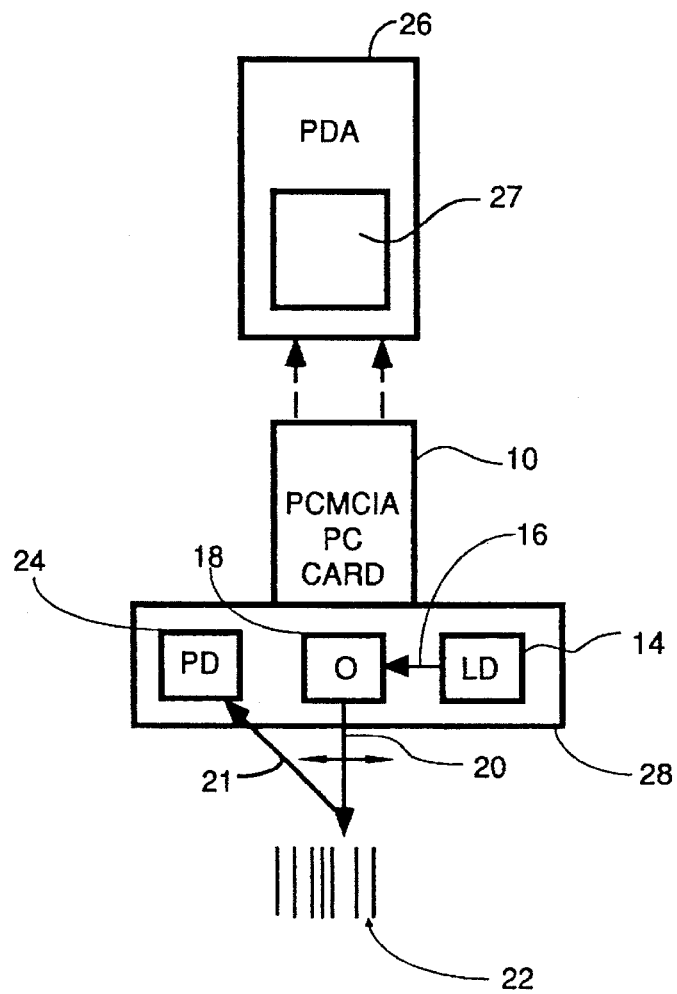
FIG. 1 is a diagram of a PC Card with integrated laser based barcode scanning engine.

Referring to FIG. 1, there is shown a diagram of the preferred embodiment of a portable laser-based barcode scanner peripheral with a PCMCIA PC Card interface in accordance with the genus of the invention. The peripheral comprises a PCMCIA defined PC Card 10 which has integrated thereon an interface circuit for a portable laser based barcode scanning engine mounted within a housing 13 which is permanently affixed to the PC Card. The interface circuit on the PC Card can be designed in any one of many different ways, and the general principles of interfacing to microcomputers are known. Many very good publications exist in this area, one of which is "Microcomputer Interfacing" by Bruce Artwick (Prentice Hall, Englewood Cliffs, N.J.) 1980 ISBN 0-13-580902-9 which is hereby incorporated by reference.

PC Card 10, and all the other PC Cards in other embodiments disclosed herein, is compatible with PCMCIA PC Card Standards including PC Card Standard Release 2.01, Socket Services Specification Release 2.0, Card Services Specification Release 2.0, ATA Specification Release 1.01, AIMS Specification Release 1.0 and the Recommended Extensions Release 1.0, all of which are incorporated by reference herein.

Incorporating an Interface for any input device, and especially a barcode scanning engine on a PC Card for a PDA such as the Apple Newton(™) using open systems standards has several advantages. First, such a portable barcode scanning system can be less expensive since the general purpose devices are mass produced such that economies of scale and other price erosion factors such as rapid obsolescence apply to hold the price down and to lower the price over time. Second, it is possible with an open system interface to avoid locking customers into a particular vendor or into a particular technology which rapidly becomes obsolete in the fast paced world of high technology electronics. If the barcode scanner interface or interface for other input device such as a magnetic strip reader etc. is integrated into a PCMCIA defined PC Card such that the input device can communicate with the host PDN/palmtop via an industry standard PCMCIA bus, the user may simply slip the PCMCIA defined PC Card interface into another palmtop or PDA when a new generation input device or PDA becomes available. This same concept means rapid turnaround time for maintenance in case of failure of the input device or PDA.

Returning to the discussion of PCMCIA based barcode scanning engine, the barcode scanning engine input device uses a visible light or infrared laser diode 14 to generate a beam of visible, coherent light 16 which is coupled to the input of known scanning optics 18. If an infrared laser diode is used, a spotter beam or light source that is comprised of visible light and which is directed by the same scanning optics used by the laser is usually used. The purpose of the scanning optic system 18 is to receive the light beam 16 and to focus the beam down to a small spot size and to scan the output beam across a barcode 22 located at a reference plane which is anywhere from less than an inch to several feet away from the laser scanning engine. The scanning optics 18 should focus the output beam 20 down to a spot size at the reference plane where barcode 22 exists which is small enough to resolve the light and dark patterns of barcode 22. An acceptable spot size at the reference plane would be approximately 6–12 mils across.

Further, the scanning optics might and usually does scan the output beam 20 through a range of movement at the focal plan which is large enough to span any barcode to be scanned. Typically, barcodes are less than two inches across, although in some applications, they can be wider. The scanning optics 18 should cause the output beam 20 to be focussed at a focal plane which far enough away from the scanner to give the scanner a useful range such that barcodes can be scanned at a distance without having the scanner in physical contact with the barcode. Generally, this range is from about two inches up to about two feet although longer ranges are desirable in some applications. Further, the scanning optics 18 should focus the output beam at the reference plane such that the output beam has a sufficiently large depth of field that the barcode does not have to be located exactly at the focal plane to be decoded. Generally, the depth of field, should be made as large as possible, and an acceptable depth of field would be about from one to twenty inches on either side of the focal plane with a focal plane located about three to four inches away from the scanner.

A suitable optical system 18 to focus a output beam from a laser diode is disclosed in U.S. Pat. No. Pat. 5,021,641 which is hereby incorporated by reference as one of many possible embodiments for the laser scanning engine within housing 13. In the preferred embodiment of the input device structure shown in FIG. 2, a visible laser diode is substituted for the invisible light laser diode of U.S. Pat. No. 5,021,641 and the visible light source and 3-state trigger of that patent are eliminated. A software trigger to be described below or no trigger mechanism at all is substituted. The optical system taught in U.S. Pat. No. 5,021,641 uses an aperture stop which is circular and approximately 1.2 millimeters in diameter to cut beam from this section of the output beam from the laser diode to acceptable limits. This aperture stop is located from about 9.7 millimeters to 9.2 millimeters away from the emitter of the laser diode.

The system disclosed in U.S. Pat. No. 5,021,641 utilizes a laser diode which does not emit visible light. This is inconvenient to users who must aim the scanning beam such that it traverses the barcode but who do not know the path the beam is travelling because of its invisible nature. Therefore, to improve the user interface, the optical system taught in U.S. Pat. No. 5,021,641 includes a trigger activated visible light aiming system and a movable scanning mirror. A manually operated trigger has three states: "off", "aim" and "scan". In the first "off" state, all optical components are off. In the "aim" state, the visible light source is on and the movable scan mirror is in a stable, non-moving state centered in its path of movement. The user then directs the physical movement of the overall scanning system such that the visible light spot is centered on the barcode to be scanned. The user then moves the trigger to the "scan" state, and the laser diode is powered up and the scanning movement of the scanning mirror is started. This causes the invisible laser light from the laser diode to be scanned across the barcode and causes reflected light from the barcode to impinge upon the photodetector.

Reflected light from the barcode being scanned, represented by vector 21 is detected by photodiode 24 and an analog signal is generated for decoding by interface circuitry on the PC Card 10. The PC Card 10 slips into either a type II, or III PCMCIA slot of a personal digital assistant (PDA) or palmtop computer 26 which hereafter will be referred to as the portable host or the host.

The portable host 26 has a CPU and associated control program (not separately shown), a display 27 and possibly a keyboard. In the preferred embodiment, the PDA is an Apple Newton Model 110 with a pen based display user input system. The CPU and associated control program of the portable host can do the decoding of the barcode in some embodiments, but in the preferred embodiment, the decoding is done by a microprocessor on the PC Card interface circuit 10. Decoding of the barcode by the PDA CPU is done by reading digital data representing a "digitized image" of the barcode pattern from a memory in the PC Card 10 and analyzing the ratios between the lengths of the various light and dark spaces. The "digitized image" as that phrase is used herein means a string of logical 1's and 0's stored in sequential memory locations which encode the transition between light and dark and the relative spacing between these transitions as opposed to actual analog-to-digital conversion of the analog values of a video signal at a plurality of pixels of a raster scanned image of the barcode.

Figure 2:
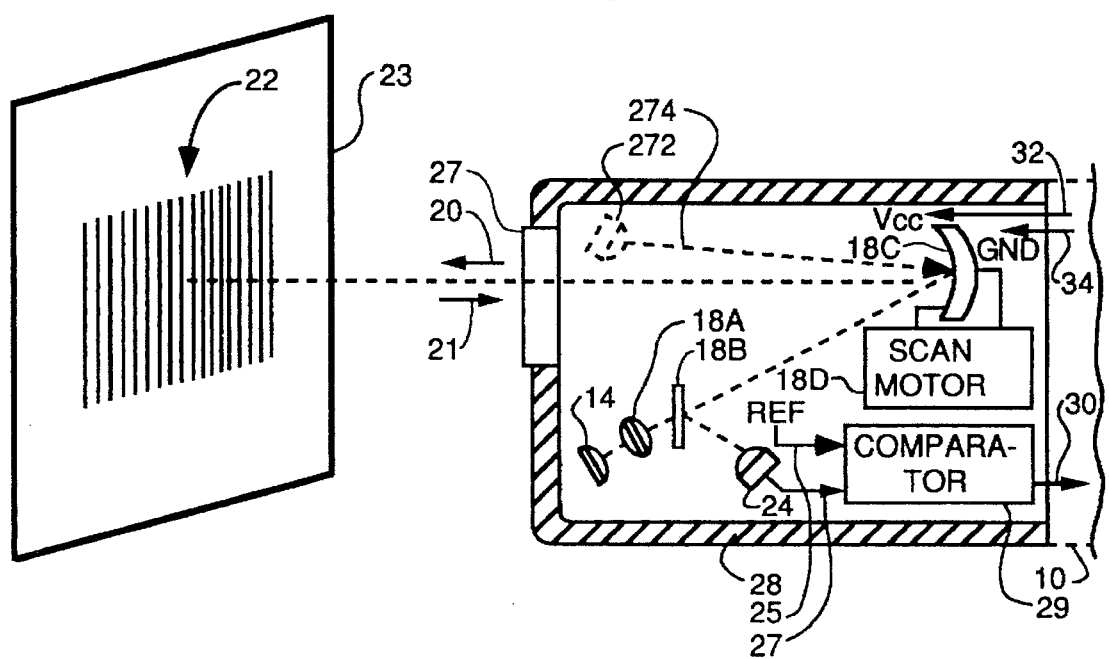
FIG. 2 is a cross-sectional diagram of a typical laser diode based barcode scanning engine that can be integrated within a housing affixed permanently or by clip-on connection to a PC Card.

Referring to FIG. 2, there is shown a drawing of one embodiment for a visible light laser diode barcode scanning engine which can be embodied within housing 13. Although the particular details of the construction and arrangement of the laser barcode scanning engine are not critical to the invention, the arrangement of FIG. 2 is one structure that is contemplated to be within the teachings of the invention. A semiconductor visible light laser diode 14 emits a coherent light beam when scanning of a barcode starts. The light beam is focussed by a lens 18A and passes through a partially silvered mirror 18B. The light beam generated by the laser diode exits the partially silvered mirror and impinges upon a scanning mirror 18C which is driven in an oscillatory pattern by a scanning motor 18D. The scanning motor 18D may be a stepper motor, a piezoelectric motor, one or more bimorphs, a D.C. motor, one or more solenoids, a mylar film resonant motor or any other source of motive power which can oscillate the mirror 18C at the desired scan rate. The scan rate can be any desired rate, but generally 200 scans per second is typical. The resultant scanning laser beam 20 exits a light-transmissive window 27 and scans repeatedly across a barcode symbol 22 located at a reference plane 23. Reflected light, symbolized by arrow 21 re-enters housing 28 through light-transmissive window 27 and impinges upon scanning mirror 18C where it is reflected toward partially silvered mirror 18B. A portion of the reflected light is deflected into the input aperture of photodiode 24 where the intensity of the reflected light over time is converted into an analog signal called HHLC. This conversion is done by comparator 29 which receives the raw analog signal from the photodiode on line 27 and compares the voltage thereof to a reference voltage on line 25. The reference voltage is set at a level such that if the analog voltage on line 27 is higher than the reference voltage, the reflected light which generated that voltage level on line 27 was, in all probability, light from a white space portion of the barcode being scanned. If the analog voltage on line 27 is lower than the reference voltage, it is likely that the reflected light was from a dark portion of the barcode. The comparator 29 outputs a TTL level signal which switches states from logic 1 to logic 0 each time the voltage level on line 27 drops below the reference voltage level and which transitions from logic 0 to logic 1 each time the voltage on line 27 rises above the level of the reference voltage.

More detail about the structure depicted in FIG. 2, the structure of the scanning motor and the shock resistance thereof, can be gleaned from study of U.S. Pat. No. 5,198,651 which is hereby incorporated by reference. Details of other laser scanning engines which are exemplary of the types of laser scanning engines which may be incorporated within housing 28 are given in U.S. Pat. Nos. 4,387,297, 4,760,248, 4,409,470, and 4,652,750, all of which are hereby incorporated by reference.

In some embodiments within the scope of the teachings of the invention, circuitry will be included to decode the HHLC signal output from the laser scanning engine within housing 28 and output the ASCII or EBCDIC alphanumeric characters to interface circuitry on the PC Card. The PC Card interface then buffers these characters in memory and generates an interrupt to the portable host alerting the host that decoded barcode characters are available in the memory of the PC Card to be read. The nature of this decoding circuitry and the interface circuitry will be apparent to those skilled in the art from a study of the interface circuitry of FIG. 3 which describes the interface circuitry which performs these same functions on the PC Card.

Figure 3:
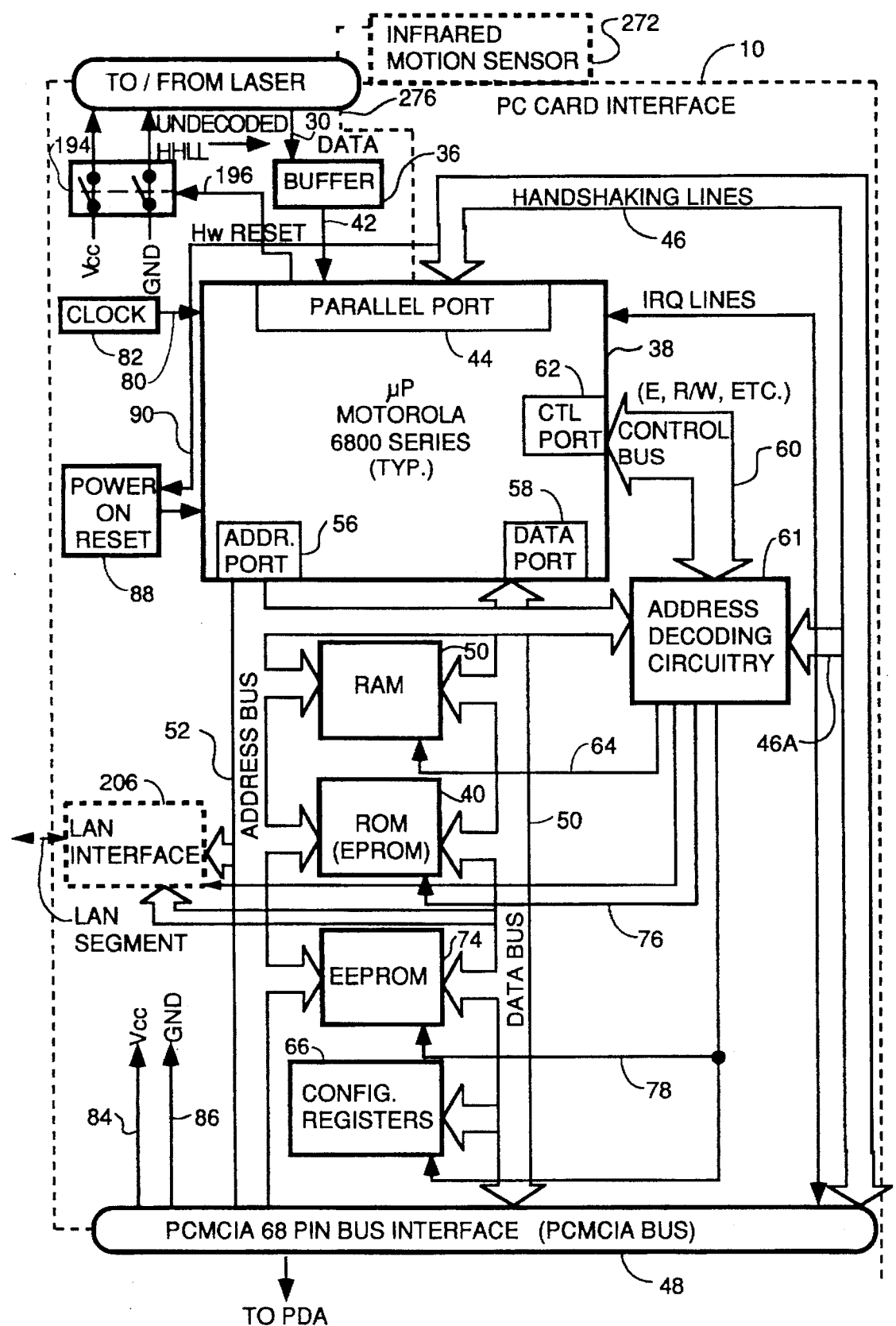
FIG. 3 is a block diagram of one embodiment of a PC Card interface circuit for interfacing to an input device such as laser based barcode scanning engine which outputs undecoded binary data.

Referring to FIG. 3, there is shown a block diagram of the preferred embodiment of the interface circuitry within PC Card 10 for an embodiment where the output of the laser scanning engine is not decoded when it arrives at the PC Card and is decoded by circuitry on the PC Card. The undecoded HHLC signal from the photodiode 24 arrives on line 30. Vcc power and signal ground are supplied to the input device components within housing 28 from the PC Card via lines 32 and 34. The undecoded signal on line 30 is buffered and level shifted if necessary by amplifier 36 to condition the signal for sampling by microprocessor 38. The microprocessor executes a decoding program encoded in read only memory 40. ROM 40 may also be EPROM, and, in the preferred embodiment, is Intel Flash EPROM. The details of the decoding program are given in the flow chart of FIG. 4 FIGS. 6A through 6C, which will be described further below. Under control of the decoding program, the microprocessor 38 samples the HHLC data on line 42 from the output of the buffer 36. Typically, the microprocessor 38 is a Motorola 6800 series machine, but it can be any of a number of different microprocessors.

The signal on line 42 will be essentially a binary representation of the barcode being scanned in that it will be logic 1 for times when the laser beam is impinging upon and reflecting from white spaces and logic 0 when the laser beam is impinging upon and reflecting from dark portions of the barcode (or vice versa). The amount of time the signal on line 42 is logic 1 and logic 0 is determined by the pattern of the barcode and the speed of scanning. However the alphanumeric information encoded within the barcode is usually encoded by the ratios of light to dark spaces, so the relative times that the signal on line 42 is logic 1 and logic 0 is what is important.

The signal on line 42 is sampled at one pin of a parallel port 44. Other pins of this parallel port are coupled to various handshaking lines on bus 46. This handshake bus is coupled to the 68 pin edge connector PCMCIA defined PC Card bus/interface 48 hereafter referred to as the PCMCIA Bus 48. In the preferred embodiment, the decoded alphanumeric data from the barcode will be passed to the PDA by placing the alphanumeric data in random access memory 50 (hereafter RAM) and notifying the PDA to retrieve the data from the RAM 50. RAM 50 is coupled to a shared address bus 52 and a shared data bus 51, both of which are coupled to the microprocessor 38 address and data ports, respectively, and the address and data lines of the PCMCIA Bus 48. RAM 50 is memory mapped in the Common Memory address space shared by both the PDA 26 and the microprocessor 38. This Common Memory address space is defined by the PCMICA standards that have been incorporated by reference herein. The signals on the handshake bus 46 are used to control whether the microprocessor 38 or the PDA has control of the shared address bus 52 and the data bus 51 coupled to the RAM 50 at any particular time so as to prevent bus conflicts. No bus arbitratration is necessary in the preferred embodiment, although a separate bus arbitration chip is within the genus of the invention for alternative embodiments.

One manner of using the handshaking signals on the handshake bus is for the microprocessor 38 to assert a Ready/Busy signal on bus 46 when microprocessor 38 is busy writing decoded data to the RAM 50 and does not want to be interrupted. This restricts the PDA's access to the PC Card until microprocessor 38 is finished writing a decoded message to RAM 50. Decoded alphanumeric data is written to RAM 50 by microprocessor 38 by using address port 56 to output on address bus 52 the address of the storage location in RAM 50 with a decoded alphanumeric character to be written or programmed. To select RAM 50 and control the read/write mode thereof, the microprocessor 38 writes appropriate control signals on control bus 60 via control port 62 to address decoding circuitry 61. The address decoder 61 receives the read/write control signals on control bus 60 and the address from address bus 52, determines that the address is in the address space occupied by RAM 50 and activates chip select and read/write control signals on bus 64 to select RAM 50 and place it in write mode. The data to be written is placed on data bus 51 via data port 58 and will then be placed by RAM 50 into the desired storage location.

A complete message as that term is used herein represents all or some selected subset of the data encoded within the barcode that has been scanned. In the preferred embodiment, when a complete message has been decoded and written into RAM 50, the microprocessor 38 notifies the PDA 26 to retrieve the data. To do this, the microprocessor 38 activates some signal that will be detected by the PDA and passes the PDA pointer and length information. The pointer information comprises a pointer address indicating where in the Common Memory address space the message starts. The length information indicates how many storage locations need to be read to get the complete message.

In alternative embodiments, the microprocessor 38 notifies the PDA each time any character from the message has been written into RAM 50.

Notification of the PDA of the existence of a decoded message is done by either activating an interrupt signal on the handshaking bus 46 or by setting a bit in one of the configuration registers 66 that is periodically polled by the PDA.

The configuration registers 66 comprise a Configuration Option register and a Card Configuration and Status Register. The Card Configuration and Status Register is located two bytes above the Configuration Option register in the Attribute Memory space (see FIG. 4 for the details of the three PCMCIA defined regions in the address space of a PC Card). The Card Configuration and Status Register provides the PDA with a mechanism to control a Status Changed Signal, an Audio Signal and a Power Down Request. It also provides status information in the "set" or "not set" states of certain bits defining a Status Changed State and an Interrupt Request State.

In the preferred embodiment, the PC Card notifies the PDA of the existence of a message to be picked up by asserting a Level Mode Interrupt signal on the handshake signal bus 46.

The microprocessor 38 can be interrupted by the PDA via an IRQ signal line 70. Such an interrupt request could be asserted by the PDA, for example, when the PDA has control of the shared address and data buses 52 and 50, respectively, so as to prevent the microprocessor 38 from attempting to take control of these shared buses. The interrupt service routine of the microprocessor 38 would put the micprocessor in a suspended state where no processing is carried out since it is not possible for the microprocessor 38 to access program instructions from ROM 40 while the PDA has control of the shared buses 50 and 52.

Chip selection of ROM/EPROM 40 and EEPROM 74 to activate these memories and read/write control of EEPROM 74 is carried out via control bus 60, address decode circuitry 61 and buses 76 and 78, respectively. EEPROM 74 is used to store PC Card Information Structure (CIS) data in conformity with PCMCIA standards, said CIS data defining the formatting and organization of data on the PC Card. In this way, any new PDA can read the CIS data to determine the format and organization of data stored in the PC Card to insure compatibility of the laser based barcode scanner across multiple platforms having standard PCMCIA slots.

The microprocessor 38 receives a clock signal on line 80 from clock 82. Power and ground connections are supplied to the PC card from the PDA via lines 84 and 86, respectively from the PCMCIA Bus 48. At power up time, a Power On Reset circuit 88 generates a rest signal which resets all circuits of the PCMCIA interface circuit. A PCMCIA hardware reset signal on line 90 from the handshake signal bus 46 causes the PC Card to be reset under control of the PDA in case of a trap or other need to reset the program counter (not separately shown) of the microprocessor 38 back to its initial state. The socket services software layer described below can cause a hardware reset by asserting a Reset signal (not shown but part of the handshake signal bus 46) to the PC Card. A hardware reset automatically puts the PC Card in Memory Only Interface mode (as opposed to I/O mode) and it resets the Configuration Option Register to 00 Hex (00H). Other configuration registers and the Ready/Busy signal on the Handshake Signal bus 46 are also affected as described in the PCMCIA PC Card Document which is incorporated herein by reference.

Figure 4:
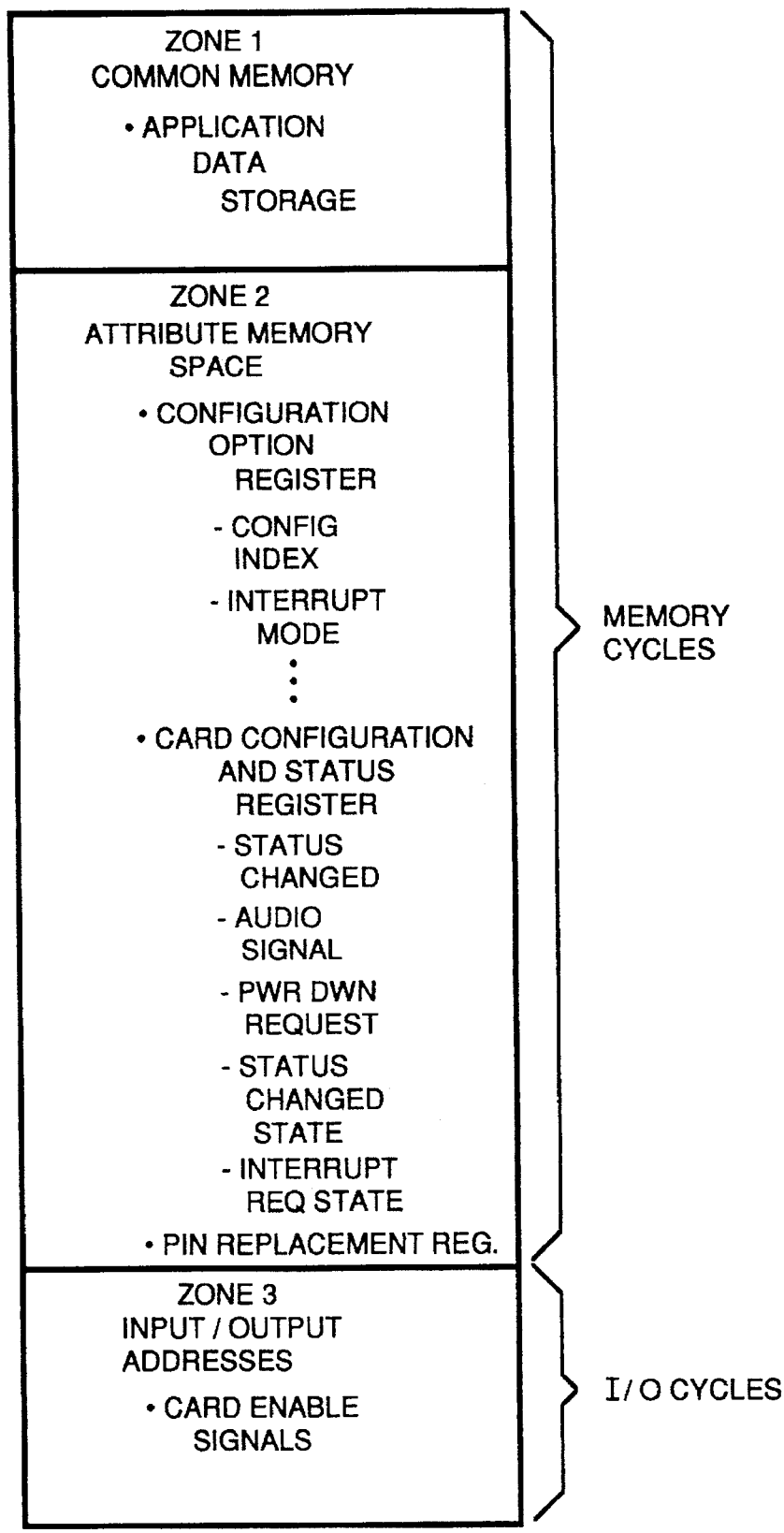
FIG. 4 is a memory map of the three memory zones of the PC Card interfaces disclosed herein.

Referring to FIG. 4, there is shown a memory map of the three zones in the address space defined for a PC Card by the PCMCIA Standards. Zone 1 is the Common Memory Space mentioned earlier. This shared memory space can be accessed either by the PC Card microprocessor 38 or by the PDA through a Memory Cycle as that term is defined in the PCMCIA Standards. The Common Memory Space is used to store application data such as the decoded data from the barcode and is used in the preferred embodiment as the principal interprocess data path between the decoding process in execution on the PC Card and any application process in execution on the PDA which needs the decoded data. In other embodiments, the decoded data can be transferred to the PDA through Input/Output cycles.

Zone 2 in the address space of the PC Card is the Attribute Memory Space. This memory space may be accessed by the PDA through Memory Cycles. The Attribute Memory Space is the address space in which the various configuration registers reside. The configuration registers 66 in FIG. 3 are defined by the PC Card Standards incorporated by reference herein and are used by the PDA to control the operational configuration of the PC Card. One of these configuration registers is the Configuration Option Register which stores the Configuration Index data in bits 0–5, the Interrupt Mode in bit 6 (pulsed=0, Level=1) and the PCMCIA Soft Reset in bit 7 (asserted=1). Another of the configuration registers is the Card Configuration and Status Register which stores data mentioned earlier herein.

Zone 3 comprises the Input/Output addresses accessed by the PDA through I/O Cycles by asserting the I/O Read signal, IORD, or the I/O Write Signal, IOWR, on the Handshake Signal bus 46 while the Attribute Memory Select Signal, REG, and at least one Card Enable signal is asserted (all of these signals are on the Handshake Signal bus 46 and are not separately shown for the sake of simplicity in the figure).

Figure 5:
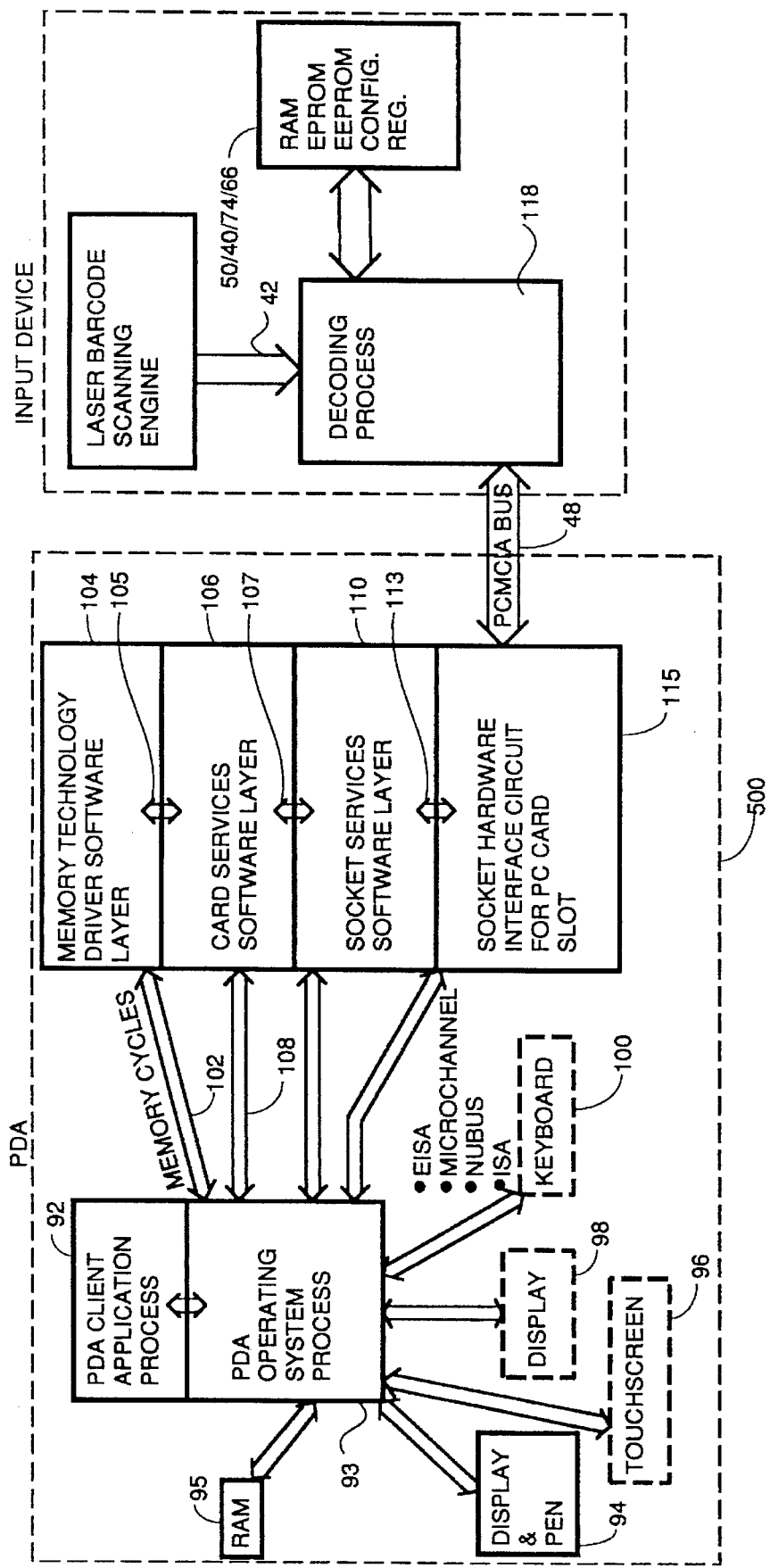
FIG. 5 is a diagram of the software architecture within the PDA which supports the PC Card.

Referring to FIG. 5, there is shown a diagram of the software architecture in the PDA to implement the industry standard PCMCIA PC Card slot and interact with the PC Card through the PCMCIA Bus. The PDA has in execution thereon a client application 92 such as an inventory processing program which uses barcode data to provide raw data input as to what merchandise is in a particular inventory. The client application 92 interacts through the PDA operating system process 93 with the RAM 95, other circuitry and "native" input devices of the PDA, i.e., the pen-based display 94 or a touchscreen 96 or a conventional display 98 and keyboard 100. The operating system process 93 receives requests from the client process 92 to read data from or write data to RAM, receives interrupts from or polls the input devices and the PC Card regarding any new data from the input devices or PC Card and passes that data to the client process 92 for processing.

The operating system process interacts with the PC Card through a multilayer software process, a hardware interface and the PCMCIA Bus. When the operating system process desires to read data from or write data to an address in the Common Memory Space, it utilizes interprocess data path 102 coupling the operating system process to a Memory Technology Driver software process 104, i.e., layer. The function of this Memory Technology Driver process is to implement an interface with a Card Services software process 106 to mask the details of accessing specific memory technologies. For example RAM is accessed differently in bipolar and CMOS and differently from one manufacturer to another sometimes. Also, RAM is accessed differently than EPROM which is accessed differently than EEPROM. To decouple the operating system process 93 from this complexity, the Memory Technology Driver software process 104 contains the appropriate protocols and driver routines to access whatever type of memory exists in the PC Card coupled to the PCMCIA Bus.

The Card Services software layer 106 serves to coordinate access to whatever PC Card or Cards that are connected to the PCMCIA Bus 48, sockets and systems resources among multiple client processes for the card(s) in the PCMCIA socket. For access to memory on the PC Card, the Card Services process 106 will receive a request via interprocess data path 105 from the Memory Technology Driver process 106. For other requests, the operating system process communicates directly with the Card Services process via interprocess data path 108. There are numerous vendors for Card Services Software listed in the PCMCIA Resource Reference Book of Spring 1994 and the details of their offerings are hereby incorporated by reference.

The Card Services process 106 communicates via an interprocess data path 107 with a Socket Services software process 110. This process 110 serves to provide a standardized programmatic interface with the PC Card such that different client applications and operating systems may be decoupled from the details of the PC Card hardware and software structure and changes therein and can communicate with and control different PC Cards in a uniform, standardized way. The Socket Services process 110 also serves to control and communicate with a Socket Hardware Interface Circuit 112 via data and control path 113 to drive and control the hardware interface for the PCMCIA Bus 48 so as to send data to, or get data from, the PC Card, receive interrupts from the PC Card, send interrupt requests to the PC Card and exchange various handshaking control signals with the PC Card. There are numerous vendors for Socket Services Software listed in the PCMCIA Resource Reference Book of Spring 1994 and the details of their offerings are hereby incorporated by reference.

The function of the Socket Hardware Interface Circuit is to drive data and control signals, power and ground potentials onto the pins of the PCMCIA Bus for transmission to the card and to receive data and control signals from the PC Card via the PCMCIA Bus and pass them to the Socket Services process 110 which then passes them to the Card Services process 106 from which they are passed, if necessary, to the Memory Technology driver process 104 and the operating system 93.

The details of the client application process 92, the operating system process 93, the Memory Technology Driver process 104, the Card Services process 106, the Socket Services process 110 and the Socket Hardware Interface circuit 115 are not critical to the invention and any process or circuit that can interact in the manner described herein in accordance with PCMCIA standards with the software and circuitry described herein as resident on the PC Card will suffice for purposes of practicing the invention.

A decoding process 118 in execution on the microprocessor 38 in the PC Card exchanges the data and control signals with the Socket Hardware interface to carry out the decoding of data from the signal on line 42 from the laser scanning engine and passing of that data to the PDA Client process 92.

Figure 6A:
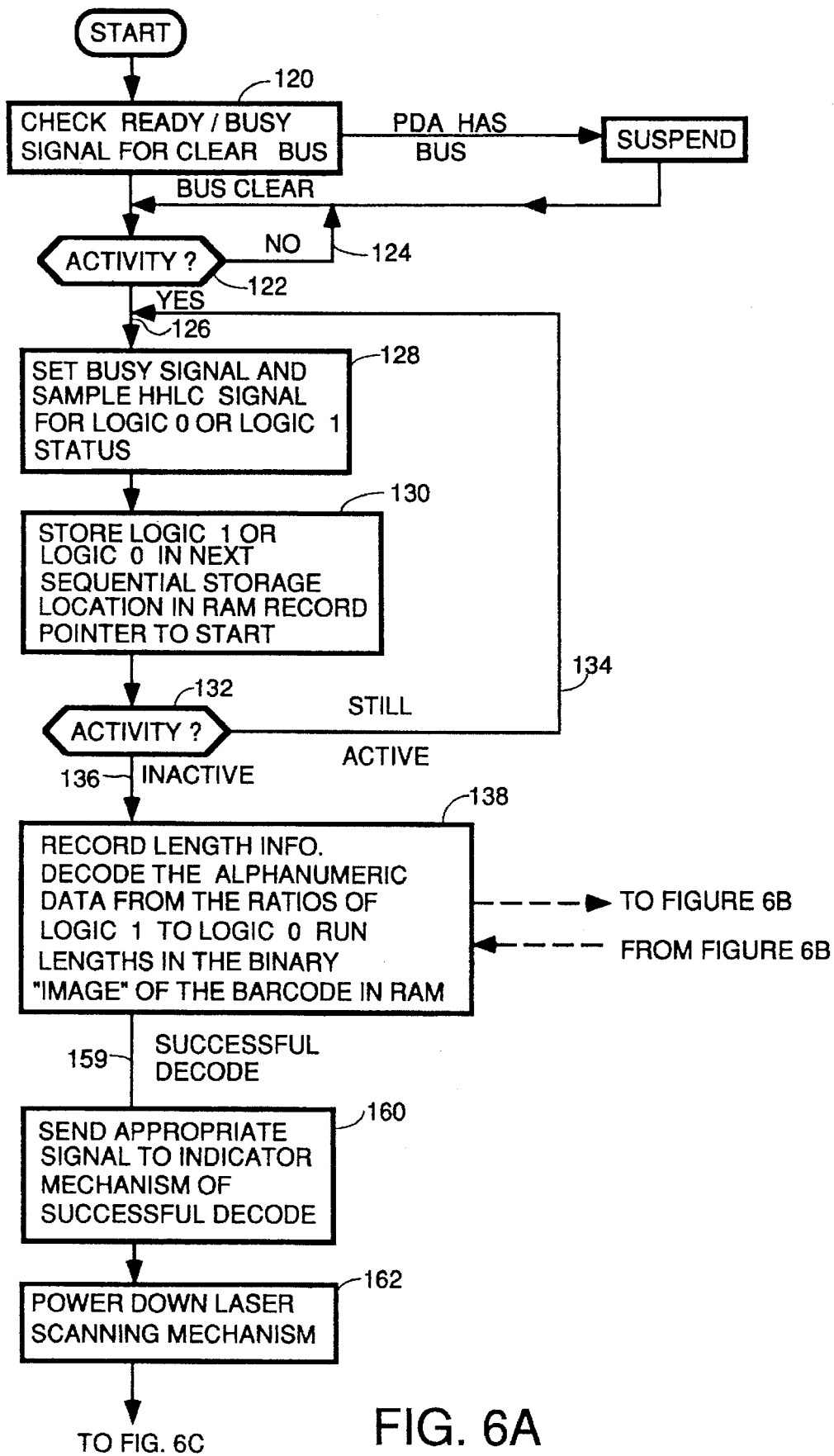
FIGS. 6A, 6B and 6C are a flow chart of the processing performed on a PC Card interface according to the teachings of the invention which samples and stores undecoded HHLC data and decodes it and sends the decoded alphanumeric characters to the PDA.

Referring to FIG. 6A, there is shown a flow chart of the pertinent parts of the decoding process 118 carried out in the PC Card in the preferred embodiment. The decoding process starts with sampling of the HHLC signal state on line 42 in FIG. 3 so as to create a binary image of the barcode being scanned in memory prior to attempting to decode the image. First, the microprocessor 38 must make sure it has control of the buses. This process is symbolized by step 120. If the PDA has control of the buses, processing is suspended until the shared buses 50 and 52 are clear. Then step 122 is performed which represents the process of polling the signal level on line 42 for changes to determine if a barcode is being scanned. If no changes are occurring, the decoding process does nothing and idles waiting for a change in level on line 42 as symbolized by path 124. As soon as change occurs, path 126 is taken to box 128 which immediately set the Ready/Busy signal on the handshake signal bus 46 to the busy state.

Box 128 generally represents the process of periodically sampling the HHLC signal on line 42 in FIG. 2 to determine its current state as either logic 1 or logic 0. This is done by performing a read operation of parallel port 44 to determine the logical state of whatever pin to which line 42 is connected.

Box 130 represents the process of storing the logic 1 or 0 obtained from line 42 in the next sequential storage location in RAM 50. The microprocessor 38 periodically reads line 42 and assigns a particular storage location in a sequence of storage locations in RAM 50 to the result of the read operation. The sequence of storage locations can be either contiguous or a linked list, the order of the locations in the sequence corresponds to the order of the read operations. Thus the sequence of logical ones and zeroes stored in the sequence of locations will represent a digital "image" of the transitions between white and black in the barcode. The "image" is not an actual image but does accurately reflect the relative widths of the white and dark spaces in the barcode, and it is in the ratios between the black and white widths, i.e., the relative widths of the white and black spaces, that the alphanumeric information is encoded. Because the reading of the status of line 42 is periodic, the number of sequential logic 1's and logic 0's reflecting the width of any particular light or dark space will vary depending upon the speed of the scan versus the period of the read cycles. However, the relative scan speeds between successive scans of the same barcode cancels out in the decoding process because the sought after information is encoded in the ratios of white to black, and these ratios remain constant for any particular barcode regardless of scan speed. Box 130 also represents a process of recording a pointer address to the start of the binary image message for data from the current scan.

Box 132 represents the process of checking for transitions on line 42 indicating that barcode scanning is being performed by the laser scanning engine. If transitions are still occurring on line 42, path 134 is taken back to the process represented by box 128 to take the next sample. If no transitions have occurred for a period long enough to indicate that no barcode is being scanned, path 136 is taken to the decode step 138. Path 136 is only taken once a complete scan of a barcode has occurred.

The first thing that is done by the process represented by box 138 is to retrieve the count from an address counter variable used that is indicative of the length of the sequence of storage locations that store the sequence of binary 1's and 0's making up the binary image of the current scan. This data will be used to flush the data from RAM 50 by a bad read routine to be described later in case of an unsuccessful decode operation. If a linked list has been used, the number of entries on the list and their locations is retrieved for passing to the bad read routine if an unsuccessful decode occurs on the current scan.

Decode step 138 represents the known process of decoding the alphanumeric data encoded in the ratios of run lengths of logic 1's and logic 0's in the binary "image" stored in RAM 50 of the barcode being scanned. The details of how to decode barcodes are well known in the art and are not critical to the invention. The barcode scanning systems commercially available from Symbol Technologies, Inc. of Bohemia, N.Y., Telxon Corporation (model PTC-600), and PSC, Inc. of Webster, N.Y. all contain such decoding software which will work to practice the invention, and the details thereof are hereby incorporated by reference. The decode routine details may depend upon the type of barcode being decoded if the decoding software does not have an autodiscrimination routine which automatically determines the type of barcode being scanned. In the preferred embodiment however, an autodiscrimination routine is included. The steps of the flow chart of FIG. 6B indicate the basic functions of the decode step 138 that should be performed.

Figure 6B:
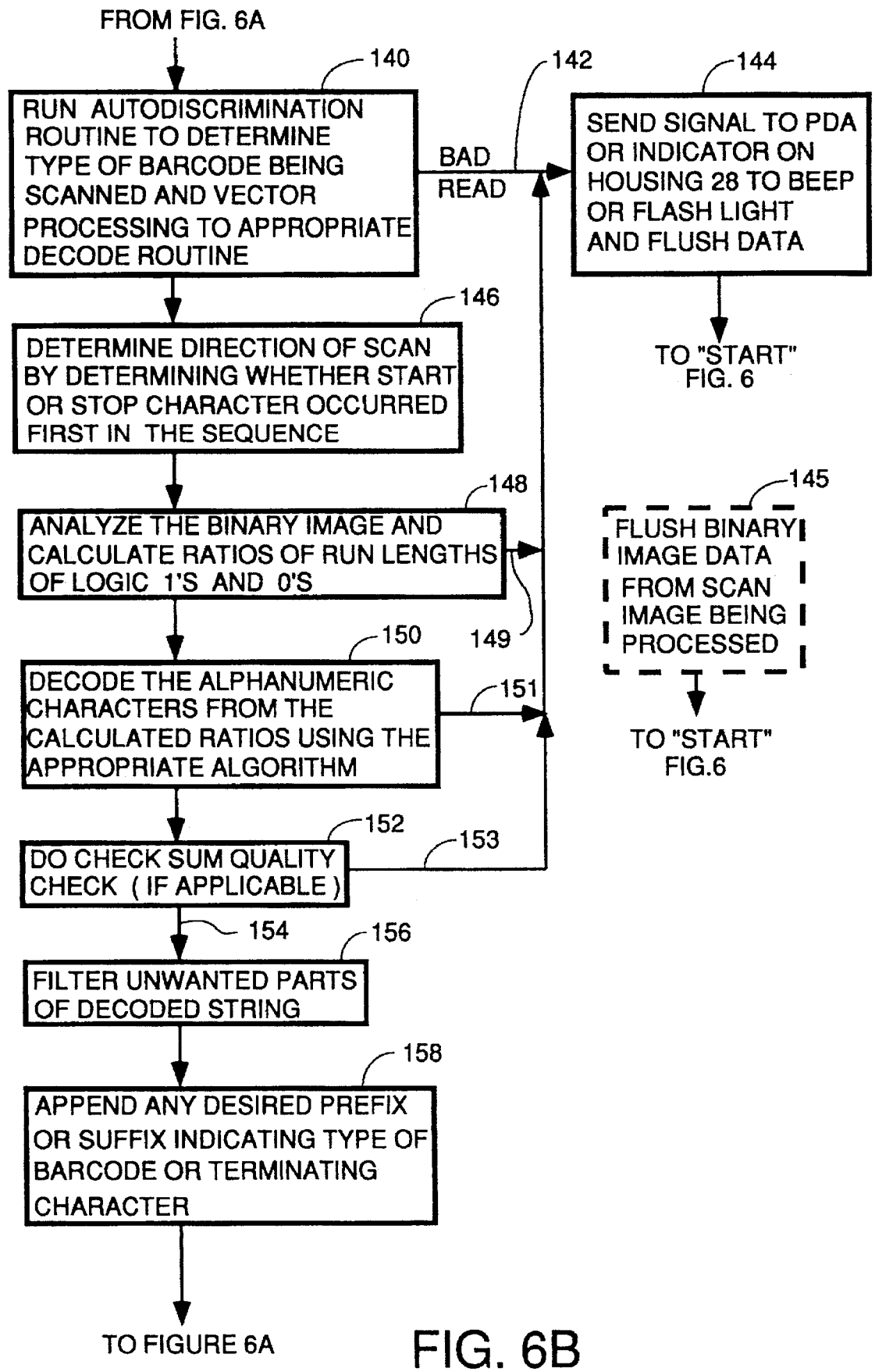

Referring to FIG. 6B, those steps will be briefly described. Box 140 represents the process of executing the autodiscrimination routine to determine what type of barcode was scanned. This is done by examining the beginning and ending segments of the binary "image" to look for the start and stop characters. These start and stop characters are different for each different class of barcodes and also indicate the beginning and end of encoded alphanumeric information. The autodiscrimination routine decodes the start and stop characters and then vectors processing to a decode routine which is appropriate to the type of barcode which was scanned. If the type of start and stop characters are not types which are recognized or indicate the barcode is of a type for which no decode routine exists in decode process 138, path 142 is taken to the "bad read" process represented by box 144. Path 142 also represents the process of passing to the bad read routine a pointer to the first location used in RAM 50 for the binary "image" of the scan being processed and length or location information indicating all the locations in which components of the image are stored. The bad read process, in one embodiment, simply sends an appropriate signal to the PDA or to some indicator mechanism on housing 28 to cause an audible beep or a flashing visual indication. In order to flush the data from the bad scan, the bad read routine then retrieves the pointer to the start of the binary image recorded for the current scan by the process of box 130 and retrieves the length of the sequence of storage locations which store data defining the "image" from the routine symbolized by box 138. The bad read routine then flushes the image data from the bad scan and resets the pointer and image length variables/counters (depending upon whether hardware or software are used to keep track of where and how long the image is in memory 50). In embodiments where linked lists are used, the bad read routine retrieves the pointer to the start of the image and the locations where each member of the sequence is stored and then flushes the data for the binary image from the RAM 50 and resets the pointer and locations data to prepare for the data from the next scan. Processing then returns to box 120 on FIG. 6A to wait for the next scan data.

If a memory useage/allocation table is used to keep track of what locations are used in RAM 50 and which locations are still available, the useage/allocation table data is altered to indicate that the locations used for the bad scan data are now available. Since scanning is continuous until either a timeout or an indication of a successful decode occurs, preferably, RAM 50 will have sufficient size to be able to store data from enough complete scans so as to not overflow by the time a bad read indication on any particular scan occurs and the memory consumed by that scan is freed by the bad read process for reuse.

An alternative bad read process to eliminate annoying visual or audible indications of bad reads is symbolized by box 145 outlined in dashed lines in FIG. 6B. In this process, the data from the bad scan is flushed in the manner described above and the pointer and length information is reset. Any memory useage/allocation table data is altered to indicate the locations erased are available for reuse.

Next, the decoding process determines the direction of scan by examining whether the start or stop character occurred first in the sequence as symbolized by box 146. If the scan was in the reverse direction, the process of box 146 will reverse the order of the decoded alphanumeric characters.

Box 148 represents the process of analyzing the binary image to calculate the ratios of the run lengths of logic 1's and 0's. This is done by counting the number of consecutive logic 1's and the numbers of consecutive logic 0's in the adjacent runs of 0's and calculating the pertinent ratios. Path 149 is taken to the bad read routine if the ratios do not calculate properly or for some reason are not valid. Path 149 also represents the process of passing pointer and length or location information pertaining to the storage locations in RAM 50 used by the "image" data for the scan being processed to the bad read routine for use by the bad read routine in flushing the image data from the bad scan.

Decoding of the alphanumeric data from the ratios calculated in the process of box 148 is symbolized by block 150. There are many different barcode encoding schemes, and block 150 represents the unique processing necessary to decode whatever type of barcode has been scanned, as determined by the process represented by block 140. For example, if a 3-of-9 barcode has been scanned, each alphanumeric character is encoded by 9 barcode elements of which 5 are black bars and 4 are white spaces. Of these 9 elements, 3 are wide and 6 are narrow. All wide elements are the same width and all narrow elements are of the same width. The process of calculating the ratios symbolized by block 148 determines from the ratios in the image what sequence of wide and narrow black and white spaces occurred. Each alphanumeric character has its own unique sequence. The process of block 150 compares the detected sequence to the known sequences, and if a match occurs, selects the assigned alphanumeric character for addition to the decoded message and moves on to the next group of barcode elements.

If decoding is not possible, i.e., there is no match on any detected sequence with a known sequence, path 151 is taken to the bad read routine symbolized by either box 144 or 145. Path 151 also represents the process of passing pointer and length or location information pertaining to the storage locations in RAM 50 used by the "image" data for the scan being processed to the bad read routine for use by the bad read routine in flushing the image data from the bad scan.

Box 152 represents the process of calculating a checksum on the decoded result and comparing it to a checksum encoded into the barcode if applicable. Not all barcodes have encoded checksums, so this step is omitted in cases where no checksum is available from the scanned barcode. In cases where a checksum is available, if the two checksums do not match, path 153 is taken to the bad read routine. Path 153 also represents the process of passing pointer and length or location information pertaining to the storage locations in RAM 50 used by the "image" data for the scan being processed to the bad read routine for use by the bad read routine in flushing the image data from the bad scan.

If the two checksums do match in the process symbolized by box 152, a successful decode has occurred, and path 154 is taken to the process of box 156.

The process of box 156 is optional, but is almost always useful. Many barcodes have some encoded characters that are not needed by the client processes that used the data such as encoded checksum, supplementary suffix barcodes, start and stop characters etc. Box 156 represents the process of filtering out any undesired characters from the decoded string. Box 156 will retrieve a filter specification from the client process 92 in FIG. 5. Typically, the user can enter data defining which portions of a barcode to filter out and this data will be stored by the client process 92 and passed to the process symbolized by box 156.

Box 158 represents the process of appending any desired prefix or suffix information to the decoded string. Typical prefix information includes some identifier indicating the type of barcode which was decoded or a terminating character indicating the end of the decoded string or which the client process 92 needs to know when it has received the last character decoded from the barcode.

Returning consideration to FIG. 6A, after successful decoding has occurred, path 159 is taken to the process symbolized by box 160. This process involves sending an appropriate signal to an audible indicator or visual indicator on housing 28 or on the PDA indicating a successful decode operation has occurred. The process symbolized by box 162 is then performed to stop the laser scanning mechanism from further scanning and cut off power to the laser, the scanning motor and other electronics within housing 28 so as to conserve the PDA battery.

Figure 6C:
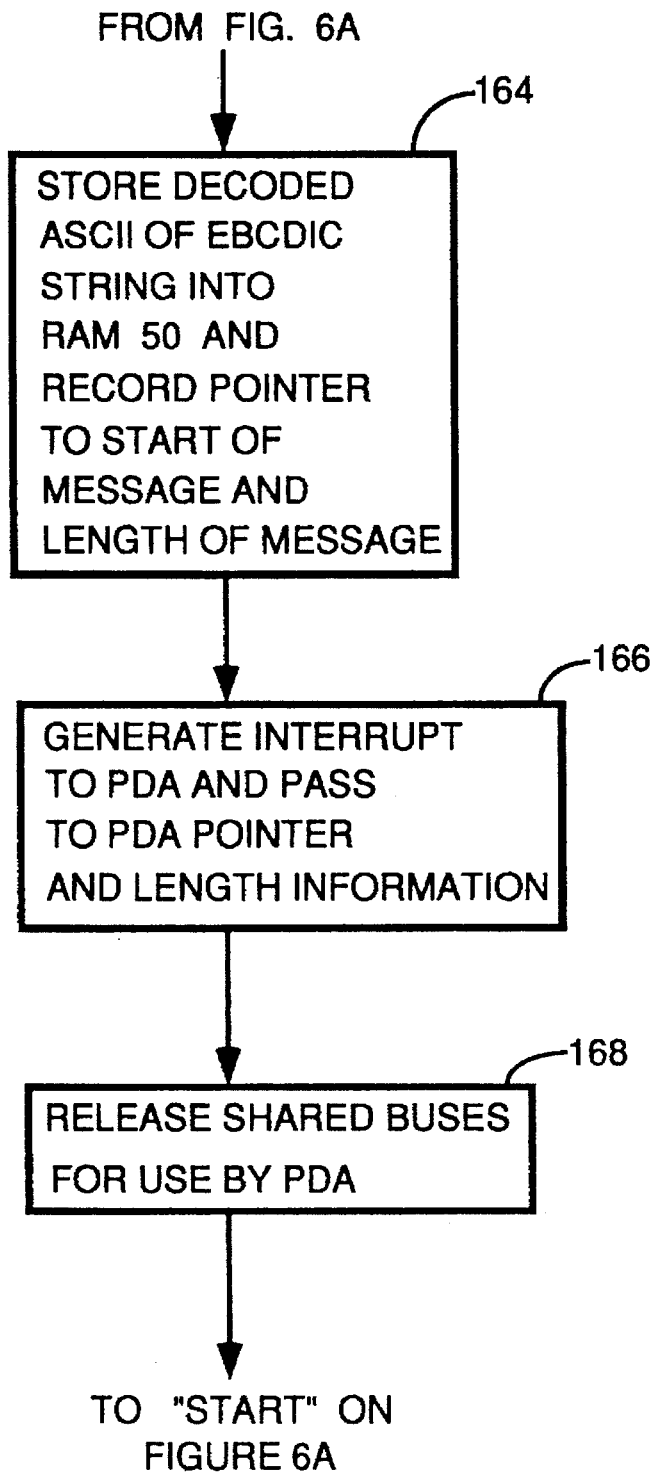

Continuing on FIG. 6C, after the laser scanning engine is shut down, the process symbolized by box 164 is performed to store the ASCII or EBCDIC characters resulting from the decoding operation in RAM 50. A pointer address pointing to the start of the message in RAM 50 and length information identifying how many storage locations should be read by the PDA to get the entire message are also stored by the process of box 164.

Next, the process symbolized by box 166 is performed to notify the PDA that a decoded message awaits in RAM 50 for use by the client application process 92 in FIG. 5. In the preferred embodiment, the PDA is notified by generation of an interrupt, although in other embodiments, the PDA may be notified of the existence of a decoded message by setting a bit in a particular location in the Common Memory Space, the Attribute Space or the Input/Output Space to a state indicating that a decoded message awaits. The Memory Technology Driver software process 104 in FIG. 5 would periodically poll this storage location using memory cycles or I/O cycles to ascertain when the particular bit changes states, and, when it does, vector processing to a routine to retrieve the pointer and length information and then to retrieve the decoded message.

The process of box 166 also represents the process of either actively transferring to some prearranged memory location in RAM 95 on the PDA or some prearranged register(s) in the PDA pointer and length information. The pointer information indicates the starting location in RAM 50 where the decoded message begins and the length information indicates how many storage locations the PDA should read.

Processing then loops back to "start" on FIG. 6A after the process of box 168 is performed to release the shared address bus 52 and data bus 50. The buses are released by reversing the state of the Ready/Busy signal to a state indicating the buses are free for use by the PDA to access RAM 50.

Note that RAM 50 can have more capacity than is needed simply to implement the PCMCIA interface. This allows the bar code scanning engine interface to have the additional function as serving as a flash memory card for the PDA since many PDA and palmtop devices are severly limited in memory capacity and need more to run complex programs. Up to four megabytes of RAM can be addressed in the Common Memory Space of a PCMCIA defined PC Card, but usually only two megabytes or less are required for the bar code scanning engine interface. This enables PDA and palmtop devices with only one PCMCIA slot to have the functionality of an expansion memory card in addition to a laser based bar code scanning or other input device without having to switch PC Cards. Expansion memory cards of DRAM, EEPROM and EPROM types are commercially available and manufacturers thereof are listed in the PCMCIA Resource Reference Book of Spring 1994. The details of these commercially available memory expansion cards are hereby incorporated by reference.

Figure 7:
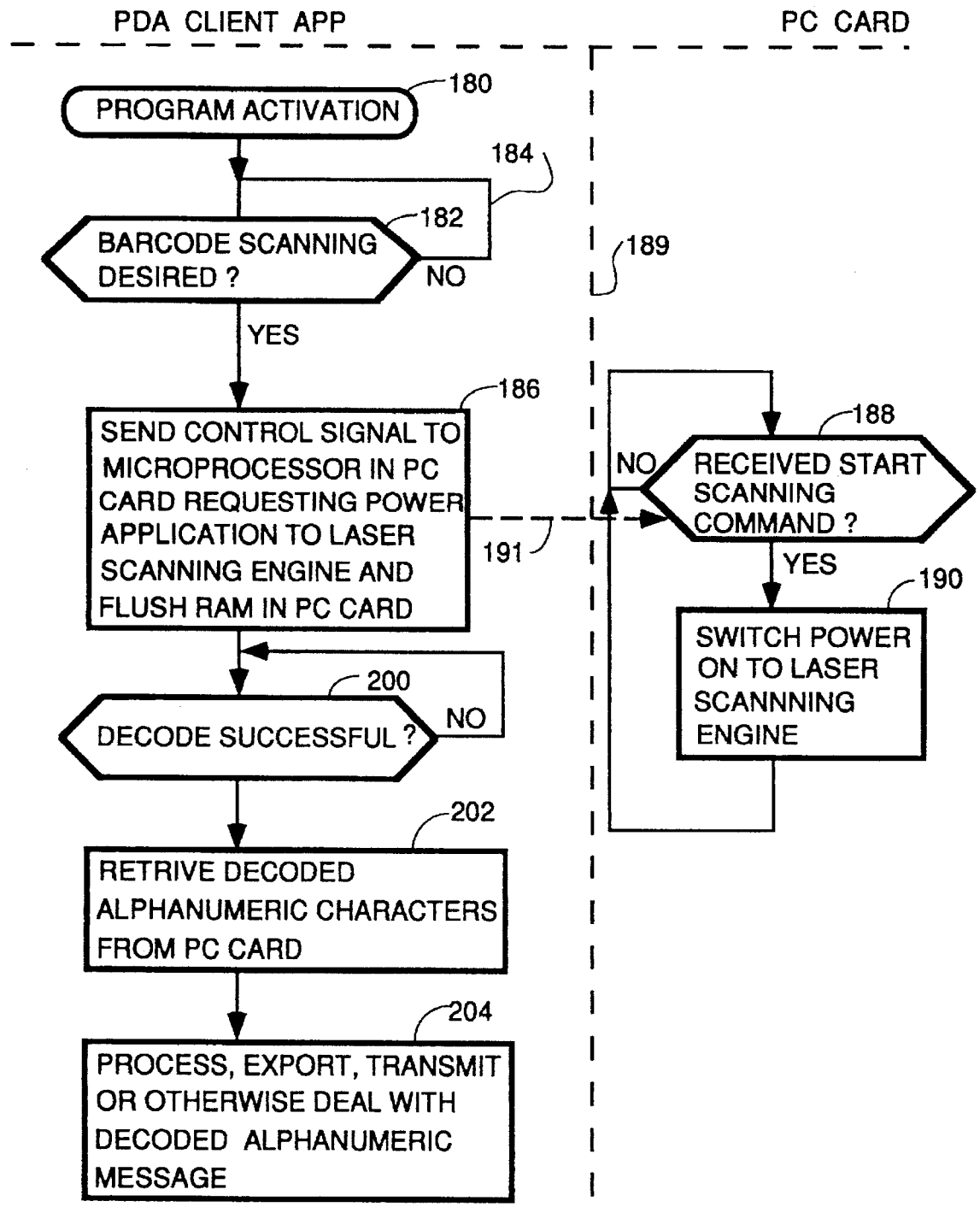
FIG. 7 is a flow chart of the processing which occurs in the PDA to support the PC Card interface to an input device such as a barcode scanning engine.

Referring to FIG. 7, there is shown a flowchart of typical processing that occurs in a client application such as client application 92 in FIG. 5 to turn the laser based barcode scanner on and collect the decoded data. The user may have several programs on his or her PDA. Block 180 represents activation of the bar code scanning application. Block 182 represents a test performed by the client application 92 to determine if the user has given a command to scan a barcode which has been placed in front of the laser scanning engine. This command can take many forms. For example, it can be a keyboard command in the case of a PDA or palmtop with a keyboard, or it can be a touch of a specific area displayed on the touchscreen 96 in FIG. 5 or pen-based display 94. In the case of a touchscreen or pen-based display, there will typically be an area displayed on the screen that queries the user for his or her intentions such as "Start Scanning?" etc.

Until the user gives this start scanning command, the client application idles as symbolized by path 184 in a typical embodiment. In alternative embodiments, the client application can process previous messages in foreground and perform the process shown in FIG. 7 in the background to collect new decoded messages to be placed in a queue for later processing by the foreground process. The latter embodiment would find typical application where heavy barcode scanning activity was occurring. No attempt will be made here to detail the processing of the forground process in these embodiments since that processing can take at least as many forms as there are uses for barcodes. For example, it may be a point of purchase program to list items purchased and communicate that data to another inventory accounting or inventory re-order process, or it may be shelf inventory program which gathers data about the type of items in inventory where the clerk enters the type information by scanning barcodes and then types or writes in the number of that type item remaining manually.

Once the user has given the start scanning command, the process symbolized by block 186 is performed. In this process, the PDA client process sends a command signal or data to the microprocessor in the PC Card telling it that the laser scanning engine is to be turned on. This triggers a process executed in the PC Card symbolized by blocks 188 and 190 to apply power to the laser scanning engine. Block 188 represents the process of polling a particular memory location or register bit to determine if the PDA has written data there indicating scanning is to be started or an interrupt service routine which is performed when the PC Card receives a particular interrupt request indicating that scanning is to be started. When the process of step 188 determines that the start scanning command has been given, the yes path to the process symbolized by block 190 is taken. The process of block 190 simply sends a command via parallel port 44 and signal path 196 in FIG. 3 to a power control switch 194 to cause the switch to apply Vcc and ground potentials to the laser scanning engine. Power to the laser scanning engine is cut off by switch 194 by the process of block 162 on FIG. 6A after a successful decoding operation has been performed. Dashed line 189 in FIG. 7 represents the hardware and software interface between the PDA and the PC Card. Specifically, dashed line 189 represents any processing necessary by: Memory Technology Driver software process 104, Card Services process 106, Socket Services process 110, Socket Hardware Interface 115 and the various interprocess transfer mechanisms, which may be necessary to get the control signal(s)/data represented by dashed line 191 properly from the PDA to the PC Card to cause the desired actions while providing a uniform, industry standard, PCMCIA defined programmatic interface to the PDA client application 92 and operating system 93 regardless of the details of the hardware or software processes implemented in the PC Card. By implementing the barcode scanning engine on a PC Card using an industry standard PCMCIA socket and bus, many advantages are achieved. Among them are: (1) many different input devices can be added to the PDA to add different functionality to it to create many different types of portable computing systems with the same PDA; (2) easy and fast maintenance because the system is not custom and the input device simply plugs into an industry standard PCMCIA socket, so when the input device or the PDA fail, a new input device or PDA can be quickly and effortlessly be substituted with very little downtime; (3) the customer is not locked into a particular technology or supplier so when technology improves or a supplier goes bankrupt or fails to introduce new technology to keep up with the state of the art, the customer can simply buy the desired technology from a different source with no fear of interoperability or compatibility problems causing downtime.

The process symbolized by block 186 in FIG. 7 also sends a command to the PC Card indicating that it is permissible to flush the RAM 50 of any binary "image" data and any decoded alphanumeric characters which are no longer needed as being related to barcodes which have already been processed by the client application 92.

After the laser scanning engine has been started and RAM 50 has been initialized, the client application simply waits for a successful decode of the scanned barcode, as symbolized by block 200. As noted earlier herein, the PC Card may notify the PDA of a successful decode by generating an interrupt, performing an I/O operation to send data to a polled location in the PDA memory 95 in FIG. 5 or some status register (not shown) within the PDA, or write data to a memory location in RAM 50 or one of the configuration registers that is regularly polled by the PDA.

Block 202 represents the process of retrieving the decoded alphanumeric characters from the PC Card. In particular, the PC Card will pass to the PDA a pointer address in RAM 50 where the decoded message starts and the length of the message. In the case of an interrupt-based notification process, block 202 represents the process of vectoring to the appropriate interrupt service routine to retrieve the message and carrying out that interrupt service routine. Processing by the service routine will set the Ready/Busy signal to a state to obtain for the PDA sole control of the shared address and data buses 52 and 50, respectively, and then carry out a number of memory cycles to retrieve the data. This is done by writing the address of the first alphanumeric character on shared address bus 52 and setting suitable control signals on Handshaking Signal bus 46 and 46A to indicate that a read memory cycle of an address in RAM 50 is desired by the PDA. This causes the address decoding circuitry 61 to activate the chip select signal coupled to RAM 50 and to generate suitable control signals on bus 64 to put RAM 50 into read mode. The desired character is then retrieved by RAM 50 and put on shared data bus 50 where it is read by the PDA. The address on the shared address bus 52 is then incremented to the next address in the message, and the process is repeated until all decoded alphanumeric characters have been retrieved.

In the preferred embodiment, the memory cycles result in the decoded data being transferred from RAM 50 in the PC Card to the RAM 95 in the PDA for further processing so as to free RAM 50 to store data resulting from subsequent barcode scans of different barcodes. In alternative embodiments, the execute-in-place capability of the PC Card will be utilized to process the decoded alphanumeric data directly out of the RAM 50 without first moving it to the PDA RAM 95 in FIG. 5. This has the disadvantage of locking out the PC Card microprocessor 38 from access to RAM 50, so no new barcode scanning can occur. However, in the case of most client applications, processing of the decoded barcode data will be so fast, that there will be no noticeable "dead" time where barcodes cannot be scanned.

Block 204 represents whatever processing the client application does with the decoded alphanumeric data from the scanned barcode. The decoded data can be processed for inventory control or point of purchase needs, exported to another process in execution on the PDA, transmitted out on a local area network to another process in execution on a different platform or otherwise dealt with including any combination of the above processing scenarios. In the case where the PDA or palmtop does not have a built-in Local Area Network interface, box 206 in FIG. 3 represents commercially-available hardware and software that has already been integrated on other PC Cards by various manufacturers for interfacing to Ethernet, FDDI, token ring etc. networks. These suppliers include Accton Technology Corporation of Fremont, Calif., and Advance Micro Devices, Inc. of Sunnyvale, Calif. as well as the other manufacturers of PC Card Ethernet, token ring and other types of LAN interfaces listed in the PCMCIA Resource Reference Book from Spring of 1994. The LAN interface can be wireless, and such PC Card based wireless LAN interfaces are available from such manufacturers as NCR Corporation of Somerset, N.J. and the other manufacturers listed in the PCMCIA Resource Reference Book of Spring 1994. The details of these commercially available LAN interfaces is hereby incorporated by reference.

The details of the LAN circuitry and hardware are not critical to the invention and will not be described here. Any network interface for 10Base2, 10BaseT, FOIRL or other type of network media from any manufacturer that can integrate the interface on a PC Card will suffice regardless of whether the interface is RF, infrared or hardwired.

Figure 8:
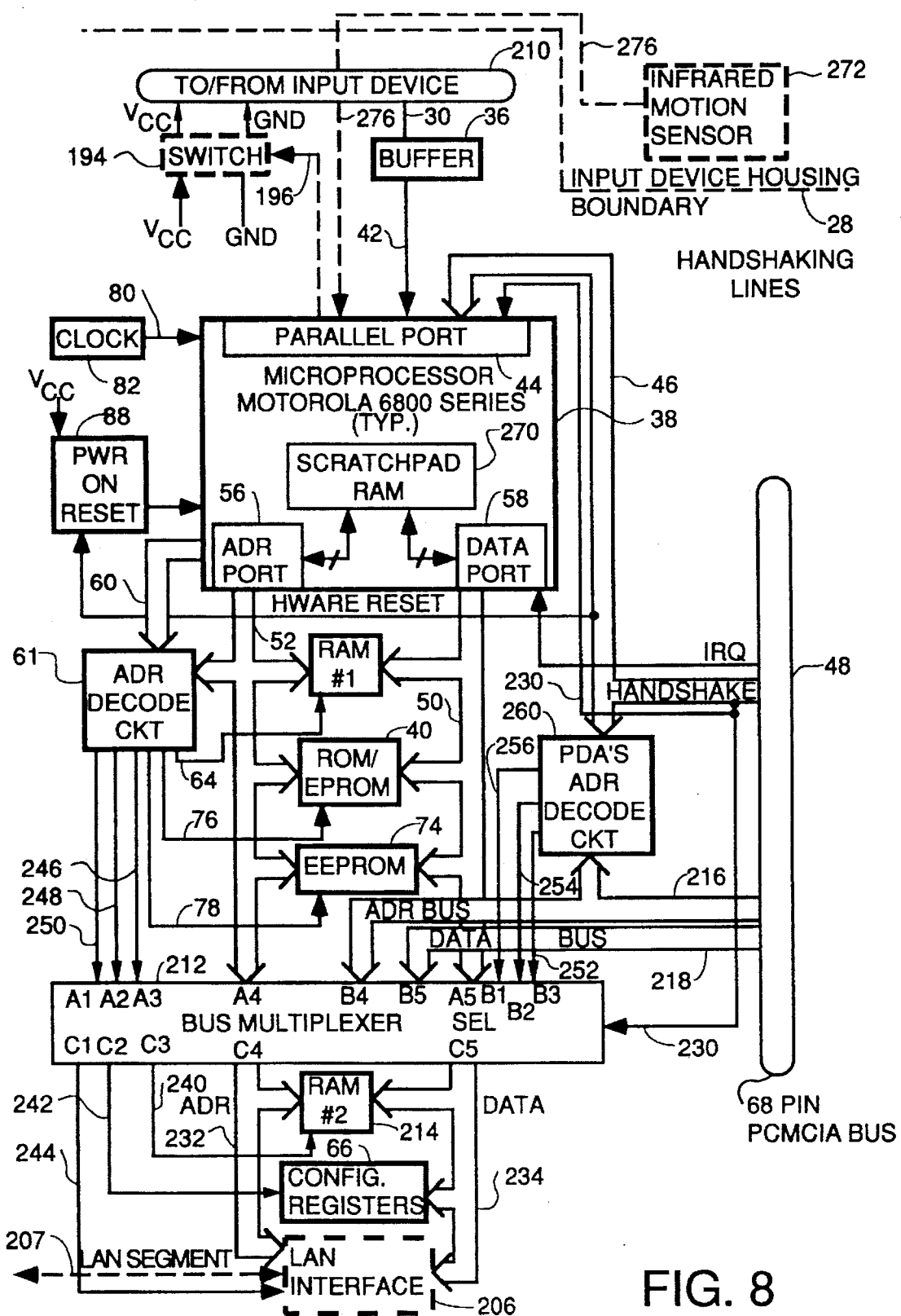
FIG. 8 is an alternative circuit for a PC Card interface circuit using one RAM devoted to the process of gathering data from the input device and another RAM in the Common Memory Space for storing data to be transferred to the PDA.

In alternative embodiments, the PC Card may contain two separate RAM memories, one of which is devoted solely to storing binary image data from the scanned barcode and storing the alphanumeric characters which result from the decoding process, and the other of which serves as expansion memory for the PDA. Such an embodiment can be used to implement any of the peripherals described herein. However, it is more useful in the slower data stream embodiments using PC Card interfaces for slow input devices such as wand-based barcode readers, magnetic stripe readers, trackballs etc. so that the microprocessor 38 in the PC Card does not dominate the shared RAM 50 during the long time it takes to process the input data in the slow input stream thereby blocking access by the PDA to RAM 50 (which may be needed expansion memory for the PDA in some embodiments). In such an embodiment, the microprocessor 38 need not check the Ready/Busy handshaking signal before accessing its dedicated memories since the PDA will not be allowed access to the memories dedicated to the PC Card microprocessor. Such an embodiment is shown in FIG. 8. In FIG. 8, circuits having the same reference numbers as circuits in FIG. 3 have the same structure and purpose in the combination and nothing further will be said about these circuits. Circuits outlined in dashed lines are optional. Note that the power control switch 194 is indicated as optional. This is because the typical input device circuitry coupled to port 210 to which the interface of FIG. 8 is typically connected consumes less power than a laser based scanning engine and may be left on all the time the PC Card is in its socket on the PDA. If a laser based scanning engine is coupled to port 210 and the interface is designed for use in a portable environment as with a PDA, switch 194 is preferred and is controlled by the microprocessor 196 either through a manual trigger or the software start-stop mechanism previously described.

In FIG. 8, RAM#1 is the random access memory devoted to the microprocessor 38 of the PC Card. RAM#2 is the expansion RAM for the PDA but is in the Common Memory space shared by the PDA and PC Card. A bus multiplexer 212 serves to select which address and data buses are coupled to the shared circuits 214, 66 and 206. The multiplexer selects either the address bus 52 or the data bus 50 of the microprocessor 38, or the address bus 216 and data bus 218 of the PCMCIA Bus 48 for application to the applicable address and data ports, respectively, of the shared circuits. Control of this selection is made by the state of the Ready/Busy signal 230 which is one of the signals on the Handshaking Signal bus 46. When this signal is in a state indicating that the microprocessor 38 is not asserting control over shared address bus 232 and shared data bus 234, bus multiplexer 212 is in a state where the address bus 216 is coupled to shared address bus 232 via input B4 and output C4 of the multiplexer and data bus 218 is coupled to shared data bus 234 via input B5 and output C5 of the multiplexer. This allows the PDA to read and write data stored in RAM#2 and the configuration registers 66 or to bilaterally communicate with the LAN Interface 206 such that data can be sent or received on LAN segment 207 (this segment can be hardwired or can be an RF or infrared link).

The Ready/Busy signal on line 230 is asserted by the PC Card when the PC Card microprocessor 38 needs to have access to one or more of the shared circuits RAM#2, configuration registers 66 or LAN Inteface 206. When the bus multiplexer 212 is in this state, address bus 52 is coupled to shared address bus 232 via input A4 and output C4 and data bus 50 is coupled to shared data bus 234 via input A5 and output C5 of the bus multiplexer.

The chip select signal inputs of the shared circuits 214, 66 and 206 are coupled to the C3, C2 and C1 outputs of the multiplexer 212 via chip select lines 240, 242 and 244, respectively. These chip select lines are coupled to chip select lines 246, 248 and 250, respectively, from the PC Card's address decode circuit 61 when the microprocessor 38 has control of the shared buses 232 and 234. Chip select lines 240, 242 and 244 are coupled to chip select lines 252, 254 and 256, respectively, from the PDA's address decode circuit 260 when the PDA has control of the shared circuits.

The parallel port 44 of the microprocessor 38 has one pin which is coupled to the Ready/Busy signal line so that microprocessor 38 can assert control over the shared buses 232 and 234 when necessary and block the PDA's access to RAM#2. This typically happens after the microprocessor 38 decodes the alphanumeric data from the barcode and has it stored in RAM#1 but wants to move it to RAM#2 prior to notifying the PDA that a message is waiting in RAM#2 for pickup. To move the data from RAM#1 to RAM#2, the microprocessor 38 uses on-board scratchpad RAM 270 to store each alphanumeric character temporarily after a read operation with RAM#1 and then writes the character from scratchpad RAM 270 to RAM#2. The microprocessor then notifies the PDA of the existence of a message in RAM#2 by one of the mechanisms previously described.

In any embodiment disclosed herein for the PC Card interface for a barcode reader input devices, an infrared motion sensor can be used as an optional means for starting the barcode reading process. This optional configuration is symbolized by block 272 outlined in dashed lines in FIG. 8, although it is equally applicable to the embodiment shown in FIG. 3. The motion sensor 272, is also shown in dashed lines in FIG. 2 showing one possible embodiment. The symbol marked 272 in FIG. 2 is supposed to represent the infrared beam generation and detection apparatus and supporting circuitry of known motion sensors such as are found in common use to turn porch lights on in homes upon the approach of a moving object to the front door of a home. The circuitry and optical design of these units is hereby incorporated by reference. Motion sensor 272 emits infrared interrogation beams from the front window 27 by bouncing a beam 274 off the scanning mirror 18c so as to direct the beam out the window 27. Obviously the scanning mirror must be able to reflect infrared radiation and the window 27 must be able to pass it. When motion occurs in front of the front window 27, the interrogation beam is reflected and doppler shift or changes in reflected energy levels trigger the motion sensor to generate a control signal on line 276 in FIG. 8. This signal is detected by the microprocessor 38 which generates a signal on line 196 to switch 194 to apply power to the other barcode scanning circuits in the housing 28. The motion sensor has power applied to it at all times the PC Card is inserted in its socket as long as the PDA is on.

Referring to FIG. 9, there is shown an embodiment of wand-type barcode reader coupled to a PDA through a PCMCIA PC Card. The wand 5 of the barcode reading engine within housing 28 is shown as tethered to housing 28 by cable 7. In the alternative, the optical and light source equipment within wand 5 may be built into a nipple projection 9 extending from the side of front of the housing 28. Wand type barcode readers require a different type of interface circuit integrated on the PC Card because the signal output from the wand type barcode reader is usually different from the signal output by a laser-based barcode scanning engine. The principal difference between the wand barcode scanning engine and a laser-based HHLC output is in the speed of the data stream. The output signal from a wand barcode reader is slow enough to decode in real time. Therefore, although the circuit of FIG. 3 may be used with or without a LAN interface, the software that microprocessor 38 implements for the interface implemented on the PC Card 32 in FIG. 9 need not buffer the data of the binary image in RAM 50. Other than that, the software that implements the wand interface on the PC Card is quite similar to the software shown in FIGS. 6A, 6B and 6C, and the software run by the client application 92, the Memory Technology driver process 104, the Card Services process 106, and the Socket Services process 110 is identical to the software symbolized by FIG. 5 and described in part in FIG. 7. Likewise, the hardware interface circuit 115 and interprocess transfer mechanisms symbolized on FIG. 5 are identical to those needed to implement the PC Card interface for a laser-based barcode scanning engine.

Referring to FIG. 10, there is show a flow chart for a typical process flow to implement a PCMCIA based PC Card interface for a conventional wand type barcode reader housed within housing 28 shown in FIG. 9 as attached to the PC Card interface circuit 32. The circuitry of either FIG. 3 or FIG. 8, or equivalents, including interfaces based upon the Dr. Neuhaus PCMCIA Interface Controller Chip, which is commercially available from Neuhouse GMBH, the details of which are hereby incorporated by reference, may be used to implement the interface on PC card 32 or any of the other PC Card interfaces disclosed herein. The software of FIG. 10 may be executed on any of these equivalent circuits.

In addition, the software depicted in FIG. 10 is only one exemplary embodiment of the type of interface software which may be executed on the circuitry integrated on PC Card 32. Numerous wand based bar code readers are presently commercially available, and the decoding software in these devices can be adapted to the requirements of the PCMCIA defined PC Card and ported to the particular circuitry used on the PC Card. The details of the commerically available wand based barcode reading software is hereby incorporated by reference.

The process symbolized by the flow chart of FIG. 10 starts by checking for activity on the signal line 42 from the buffer 36. It is assumed that Vcc power and ground potentials have been applied to the wand circuit by one of the trigger mechanisms previously described or power is applied continuously. Step 280 represents the process of monitoring line 42 for changes in the signal level thereon. If no changes are occurring, the process idles at step 280 as symbolized by path 282. Once activity is detected, step 284 is performed to sample line 42 to determine if a logic 1 or logic 0 is present. This sampling is done periodically so that the relative ratios of white space width to black space width can be calculated.

Although with a wand interface, it is not necessary to store all the ones and zeroes of the complete "image" of the barcode, it is desirable to store enough 1's and 0's to have a stored image of at least the barcode elements that make up one character or, at a minimum, enough 1's and 0's so as to have enough elements of the barcode to determine by ratios of run lengths whether a particular set of 1's or 0's is a wide bar, a narrow bar, a wide white space or a narrow white space or quiet zone. This may be done with a timer timing the times between transitions such as by using a counter which starts at one transition and stops at the next etc. and storing the times between transitions. Therefore, step 286 is performed to add the sampled logic 1 or 0 to a buffer used to store the necessary bits in the minimum image.

Step 288 represents a test to compare the sampled value from step 284 to the last sampled value to determine if the new sampled bit represents a transition from a logic high to a logic low state or vice versa. This is done so as to keep track of how many barcode elements have been received where two transitions represent the two edges of either a dark bar or a white space. It is necessary in some barcodes such as 3-of-9 to know how many barcode elements have been received so that it is known when to start decoding a character since a character is encoded into 9 barcode elements in 3-of-9 code. In some other codes, the number of barcode elements making up a character may vary, so the steps detailed herein revolving around counting how many transitions have occurred may be eliminated. The most general software interface for a wand barcode reader interface on a PC Card is shown in FIG. 11 where the type of barcode being read is detected and processing is vectored to a decode routine which is appropriate to decode that type of barcode. However, in the embodiment of FIG. 10, it is assumed that the barcode uses the same number of barcode elements to encode each alphanumeric character and only alters the sequence to distinguish between characters. As such, step 290 represents the process of incrementing a transition count kept in hardware or software. Step 292 tests the transition counter and compares the number of transitions against the number of transitions which define a complete set of barcode elements encoding one alphanumeric character.

The process symbolized by block 294 does the decoding work. More specifically, the process represented by block 294 represents a multiplicity of functions which are similar, and mostly identical to those previously described with reference to step 138 in FIG. 6A and its substeps detailed on FIG. 6B. First, the numbers of logic 1's and 0's in the run lengths are counted, and the ratios calculated and compared. This yields ratios of logic 1 to logic 0 run lengths from which the sequence and relative widths of the black bars and white spaces can be calculated. Next, if the decode step is being done on the first character, the type of barcode and direction of scan is determined by determining the sequence and timing of transitions as the start/stop character is scanned (the same character coding is used for both, but it is asymmetrical so that the direction of scan can be determined). The type of barcode can be determined by determining what start/stop character was scanned since each barcode type uses different start/stop characters. Processing is then vectored to a decoding routine which is appropriate for the type of barcode scanned and the particular sequence of barcode elements is compared to the known sequences. If no match occurs, path 296 is taken to a bad read routine which was previously described at blocks 144 or 145 of FIG. 6B. If a successful match is found, decoding of the character is deemed to be successful and the buffer memory, typically RAM#1 in FIG. 8, is flushed of any image data which pertains to the character successfully decoded. Step 298 is then performed to store the decoded character in RAM#1 or, in some embodiments, in RAM#2 so as to avoid the need for a later transfer.

Step 300 represents the process of determining whether the character just decoded is the stop character. If not, processing is vectored back to step 284 to begin the process of sampling for the image data for the next character. If the stop character is detected, the barcode has been completely scanned and decoded. In that event, step 300 represents the process of recording the length information defining how long the decoded message is and a pointer to where the decoded message starts in RAM#1 or RAM#2. Step 302 then is performed to notify the PDA of the existence of decoded barcode message and pass the pointer and length information to the PDA.

Referring to FIG. 11, a flowchart for a more general type of PC Card implemented wand interface is shown which can decode any type of barcode. It will be appreciated by those skilled in the art that the wand interfaces described herein can also be used for laser scanning engines that have a wand emulation mode and for any other type of input device which outputs a stream of 1's and 0's in which data is encoded in the ratios of the relative run lengths. Steps 304 and 306 in FIG. 11 serve the same purpose as steps 280 and 284 in FIG. 10. Step 308 represents known decoding processes in commercially available wand-based barcode readers to decode the stream of 1's and 0's. In some embodiments, this may be done "on the fly", i.e., without storing them in a buffer, and in other embodiments, this is done by buffering some or all of the "image" data. The individual steps performed as part of step 308 are as described above with reference to FIG. 6B to determine the type of barcode which has been scanned, the direction of scan, calculation of run lengths and ratios, determining the sequences of barcode elements and decoding the sequence using an algorithm which is appropriate to the type of barcode which has been scanned, calculate a checksum and compare it to a checksum encoded in the barcode, filtering out unwanted parts of the decoded message, and appending any desired suffix or prefix characters or a termination character. Steps 310 and 312 represent the process of recording,the decoded characters in either RAM#1 or RAM#2 along with a pointer to where the message starts and length information and passing the pointer and length information to the PDA with notification of the existence of the message.

Figure 12:
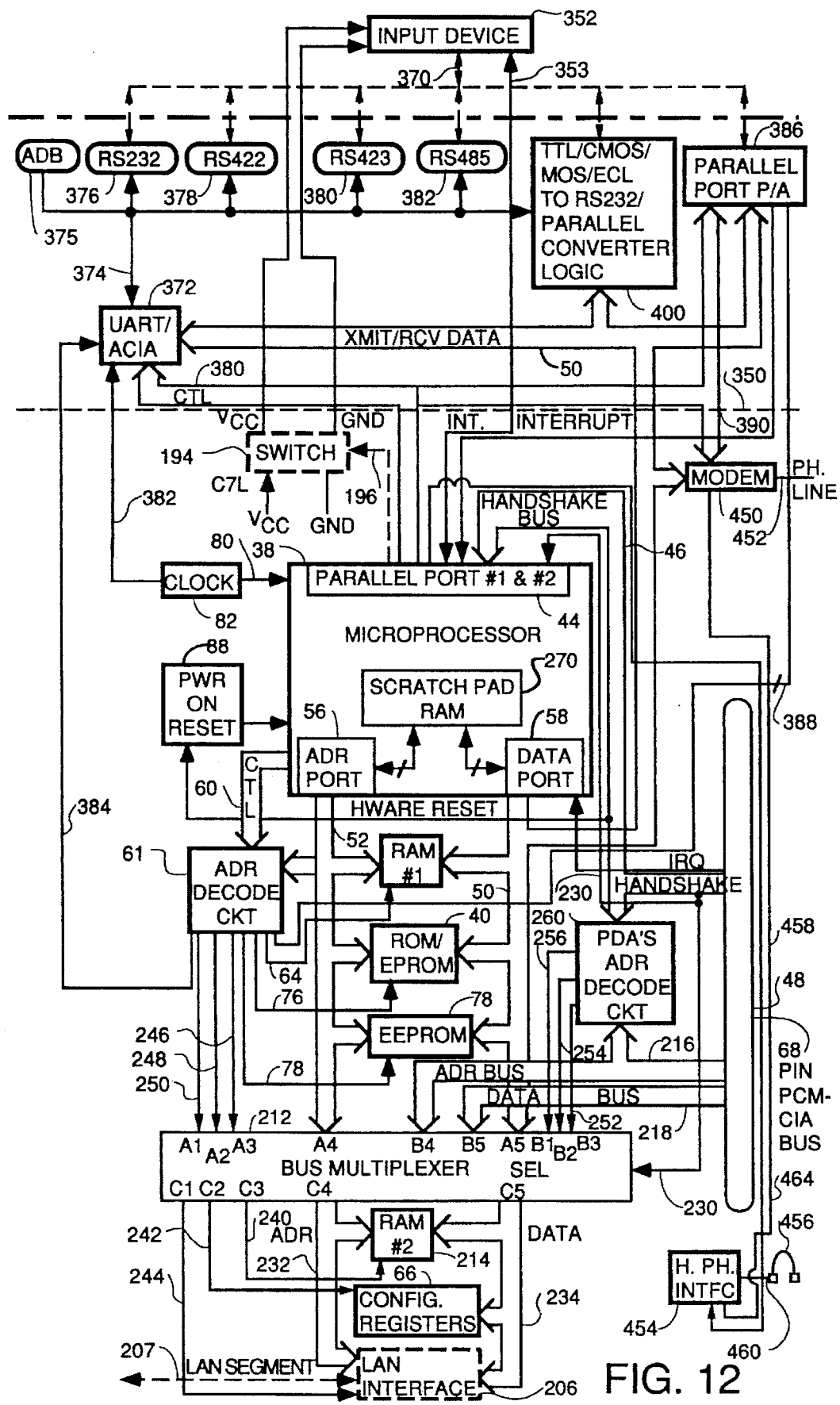
FIG. 12 is a block diagram of a PC Card interface for coupling to any type of input device which outputs serial or parallel format data or has TTL/MOS, CMOS or ECL logic level data.

Referring to FIG. 12, there is shown a block diagram of an interface for integration on a PC Card to couple virtually any type of input device that has an output port at which appear signals defined in any of the EIA defined serial interfaces, or which has a parallel format output port or which outputs data at signals at standard TTL or CMOS or MOS or ECL logic levels. The circuits that have the same reference numbers as circuits in FIG. 8 have the same structure and purpose in the combination as their counterparts in FIG. 8 and will not be described further.

Figure 13:
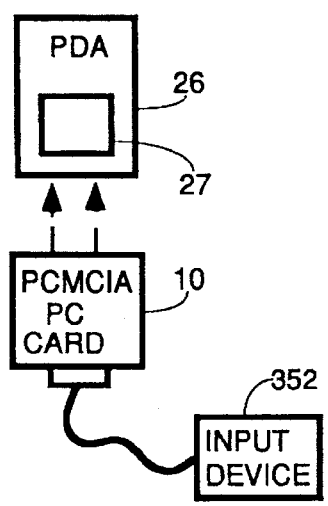
FIG. 13 shows a PC Card for any input device which outputs data in HHLC, TTL undecoded, serial RS232 etc., parallel or custom format which is tethered to the PC Card by a cable.
Figure 15:
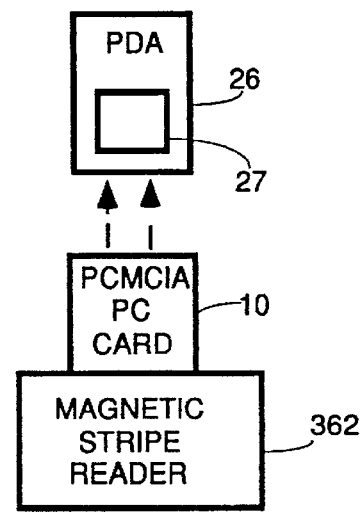
FIG. 15 represents a PC Card interface for a magnetic stripe reader.
Figure 14:
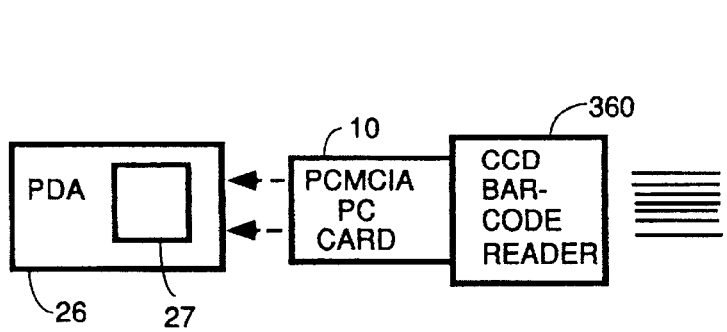
FIG. 14 depicts a PC Card interface for a CCD barcode reading engine.
Figure 18:
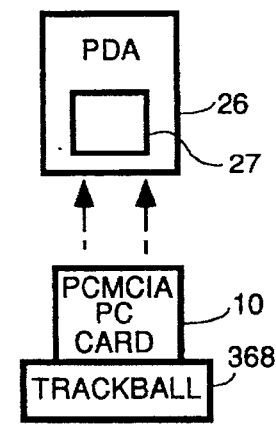
FIG. 18 represents a PC Card interface for a trackball.
Figure 16:
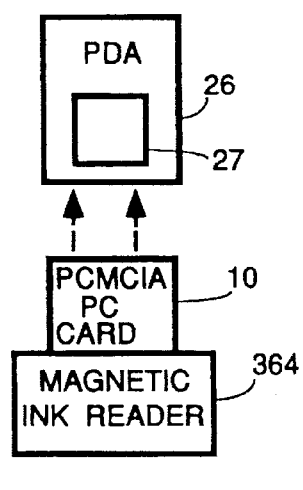
FIG. 16 represents a PC Card interface for a magnetic ink reader.
Figure 17:
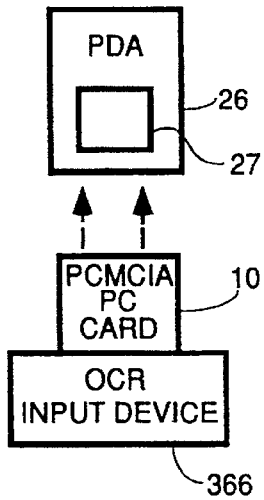
FIG. 17 represents a PC Card interface for an Optical Character Recognition input device.
Figure 19:
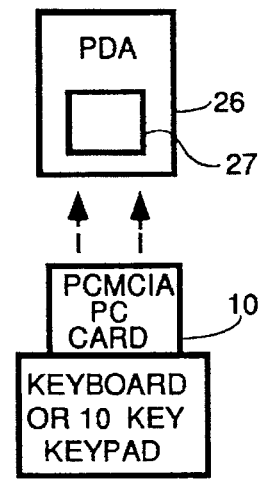
FIG. 19 represents a PC Card interface for a keyboard or 10-key keypad.

The difference between the interface of FIG. 8 and the interface of FIG. 12 is in the type of signal received from the input device. In FIG. 8, the type of signal received was a single line on which either a logic 1 or logic 0. These could be at TTL or MOS or CMOS or ECL logic levels and buffer/receiver 36 would convert them to the appropriate logic levels used by microprocessor 38. The interface of FIG. 12 functions to receive virtually any format output from an input device and convert it to signals appropriate for PCMCIA Bus 48 and get the data into the PDA. The circuitry above dashed line 350 represents the interface on the PC Card between the output of any conventional input device 352 and the PC Card's circuitry that gathers the data, converts it to PCMCIA format for the PCMCIA Bus 48 and causes the data to be input to the PDA. This circuitry can be integrated into the PC Card interface of the type shown in FIG. 12 or as shown in FIG. 3. The input device can be either integrated into a housing permanently attached to the PC Card or it can be of the clip-on variety such as taught in the parent case or such as is taught in U.S. Pat. No. 4,621,189 assigned to Telxon Corporation, which is hereby incorporated by reference. In alternative embodiments such as are symbolized by FIG. 13, the input device can be tethered to the PC Card by a cable carrying data, control and power lines. The input device 352 can be any known peripheral including but not limited to: (1) a laser-based barcode scanning engine which has a port for data output in other than HHLC format (those type of laser scanners typically use the interfaces shown in FIGS. 3 or 8); (2) a charge coupled device based barcode scanning engine 360 such as is symbolized in FIG. 14; (3) a magnetic stripe reader 362 such as are used to read credit cards etc. as symbolized by FIG. 15; (4) a magnetic ink reader 364 such as is used to read MICR characters often seen on checks and bank drafts, as symbolized by FIG. 16; (5) an optical character recognition device 366 such as is symbolized by FIG. 17; or (6) a trackball, mouse or other pointing device, as symbolized by FIG. 18; or (7) a full size keyboard or 10 key keypad such as are used with full size computers as shown in FIG. 19. Virtually every computer peripheral has either a serial or parallel output port which can be used to connect the input device to the interface circuit of FIG. 12 regardless of whether the input device is integrated into a housing permanently affixed to the PC Card or attached thereto by clip-on mechanical and electrical connections.

Dashed line 370 represents the connection from the input device 352 to the appropriate format electrical connection to the PC Card interface circuitry regardless of whether the data transfer format is serial, parallel or TTL levels and regardless of whether the input device is tethered to the PC Card by a cable or integrated into a housing which is mechanically attached to the PC Card. Assuming that the connection 370 represents a serial data path containing the signals defined in any one of the EIA national standard serial format interfaces such as RS232C, RS422, RS423 or RS485, the microprocessor 38 will communicate with the input device through UART or ACIA chip 372. The UART/ACIA is a universal asynchronous receiver/transmitter which receives serial data on line 374 and places that data on the parallel format data bus 50 of microprocessor 38. In some embodiments, the UART may be built into the microprocessor 38 or its functions performed by software and registers within the microprocessor. Data to be transmitted to the input device, if any, can be put on the data bus 50 under program control and the UART will convert that data into a serial stream of data to be sent out on line 374 which is coupled to line 370. Actually lines 374 and 370 are multi-signal buses and includes data transfer and control or handshaking lines carrying signals such as Clear to Send, Data Set Ready and the other signals defined in the EIA national standard. Bus 374 is coupled to each of the four different serial "ports" 376, 377, 381 and 381 symbolizing each of four different EIA defined serial interfaces. In additions, an Apple ADB port 375 is also shown to Couple to input devices which output their data in ADB format. These ports 376, 377, 381 and 381 and ADB port 375 are referred to as ports even though there may not be an actual connector, and the signal lines in the serial data path may simply pass from the PC Card interface circuit directly to appropriate circuitry of the input device integrated in a housing affixed to the PC Card by permanent or temporary clip-on connections. The actual signals on bus 374 will depend upon which EIA standard serial port the input device 352 is coupled. Likewise, the particular UART/ACIA 372 selected will depend upon which serial interface defines the connection between the input device 352 and the PC Card interface. The RS232C interface port will be used herein as an example symbolizing each of the serial interface embodiments within the teachings of the invention. In the case where a UART is selected for transceiver 372, the UART must be programmed to tell it how many data bits, start bits and stop bits to use and whether parity is odd, even or none etc. This control information depends upon the input device being used and can be given to the UART by: hardwiring the various control input pins to the appropriate logic 0 or logic 1 potential sources; connecting these pins to a status register (not shown but coupled to data bus 50) which can be written with the appropriate data under program control during an initialization process; or supplied via control bus coupled to parallel port 44 on microprocessor 38. UART/ACIA 372 is coupled to clock 82 by line 382 to control its transmit baud rate, and is selected or deselected for operation by chip select line 384 from address decoder 61. The input device 352 may generate an interrupt request on line 353 to the microprocessor 38 to tell the microprocessor that data has been sent to the UART, PIA etc. or the microprocessor 38 can periodically poll the input device via line 353 to determine when data is available for the microprocessor to pick up. In the alternative, the UART/ACIA can generate an interrupt or set a bit in a register which is polled by the microprocessor 38 to indicate when data is available for pickup.

Although the UART/ACIA and microprocessor 38 are shown as coupled to the ADB port 375, other interface electronics and software may be necessary as specified by Apple Computer in their ADB specification entitled "SPECIFICATION, APPLE DESKTOP BUS", Drawing Number 062-0267 Rev. F dated Jul. 17, 1990 or any subsequent revisions to date. The details of that specification and of the commercially available hardware and software in existing computer systems such as the Apple IIci are hereby incorporated by reference.

In embodiments where the input device outputs data in a parallel format, the input device will be connected via bus 370 to a one chip parallel I/O port referred to as a peripheral interface adapter or PIA 386. A PIA is a combination of bus transceivers and registers designed to interface peripheral equipment in parallel manner to external equipment. Although a separate PIA is shown in FIG. 12, the functionality of the PIA 386 may also be embodied in the microprocessor 38 through one of its unused parallel ports. Two or more parallel input/output channels whose I/O directions are programmable are usually available. The microprocessor 38 controls the PIA 386 via parallel port 44 and control bus 380 and through bytes written to the PIA via data bus 50. The microprocessor sends data to and receives data from the PIA via data bus 50. Data bytes are sent to output registers within the PIA and control bytes are sent to control registers within the PIA under program control. The control program executed by microprocessor 38 is responsible for directing bytes on the data bus 50 to appropriate registers within the PIA by control over the addresses which appear on the address bus 52 and bits or control signals on control bus 380 (control registers within the PIA look to the control program of microprocessor 38 like memory locations since they are decoded using two or three chip select signals on bus 380 or bus 388. The PIA is enabled via the chip select bus 388 from address decoder 61. The PIA notifies the microprocessor 38 that data has been received from the input device and is stored for pickup via an interrupt request on line 390 or by setting a bit in one of the control registers which is periodically polled via the data bus 50. Interrupt and status control signal between the PIA 386 and the input device 352 are passed via interrupt and status control registers within the PIA to which the bus 370 is coupled.

The PIA typically has two data ports which are eight bits wide and which are coupled to the bus 370 for passing data to and receiving data from the input device 352. These ports are directional and each can be programmed to either send or receive data by setting of a control bit in a data direction register within the PIA. When the microprocessor 38 receives an interrupt request from the PIA or polls a bit in a control register within the PIA dedicated to interrupts and notes that data received from the input device is being stored in the PIA for pickup, the microprocessor 38 reads the output register within the PIA associated with the PIA port which has been programmed to receive. The data stored therein then appears on the data bus 50 and can be transferred to some internal register of the microprocessor, the accumulator thereof or to RAM #1 or RAM #2.

Typical PIA accept any signal level below 800 millivolts as logic 0 and anything above 2.0 volts as a logic 1. In the output mode, the PIA will typically supply 1.6 millivolts of sink current or one standard TTL load. The above discussion typically defines the characteristics of port PA of a typical Motorola PIA (Model 6821) Typical Motorola PINs have different characteristics for their PB ports, and this port can be used generally if high power switching control of the input device is needed (typical current sink capability of one milliamp at 1.5 volts).

The Motorola 6821 PIA also has two discrete programmable I/O lines (CA2 and CB2) and two discrete input-only control lines (CA1 and CB1) which can be coupled to bus 370 and which respond to bits in the control registers in the PIA. The CA1 and CB1 lines can each be programmed to cause interrupts on the rising edge of data at the CA inputs for use by the microprocessor in controlling the input device and in controlling data transfers between the PIA and the input device or microprocessor 38. The CA2 and CB2 lines can be programmed to act as interrupt lines or output lines for use by the microprocessor in controlling the input device and in controlling data transfers between the PIA and the input device or microprocessor 38.

To interface with input devices which do not have either industry standard serial or parallel data outputs interface circuit 400 is provided. The details of this circuit are not critical to the invention and depend upon exactly what the input device output structure and signal levels are. Interface circuitry 400 is designed to accept whatever logic levels are inherent in the technology used by the particular input device 352 coupled to the PC Card. The technologies involved can be anything from TTL to MOS/CMOS or ECL. Typically, interface circuit 400 has the same structure as either PIA 386 or ACIA 372 with whatever additional driver/receiver circuitry and level shifting circuitry is necessary to convert from the logic levels in use by the input device 352 to the logic levels used by microprocessor 38 plus the necessary data storage and control circuitry to put the level shifted data on bus 374 in serial format or on data bus 50 in parallel format in a manner consistent with discussion herein of the operation of PIA 386 and the UART/ACIA 372.

Figure 20A:
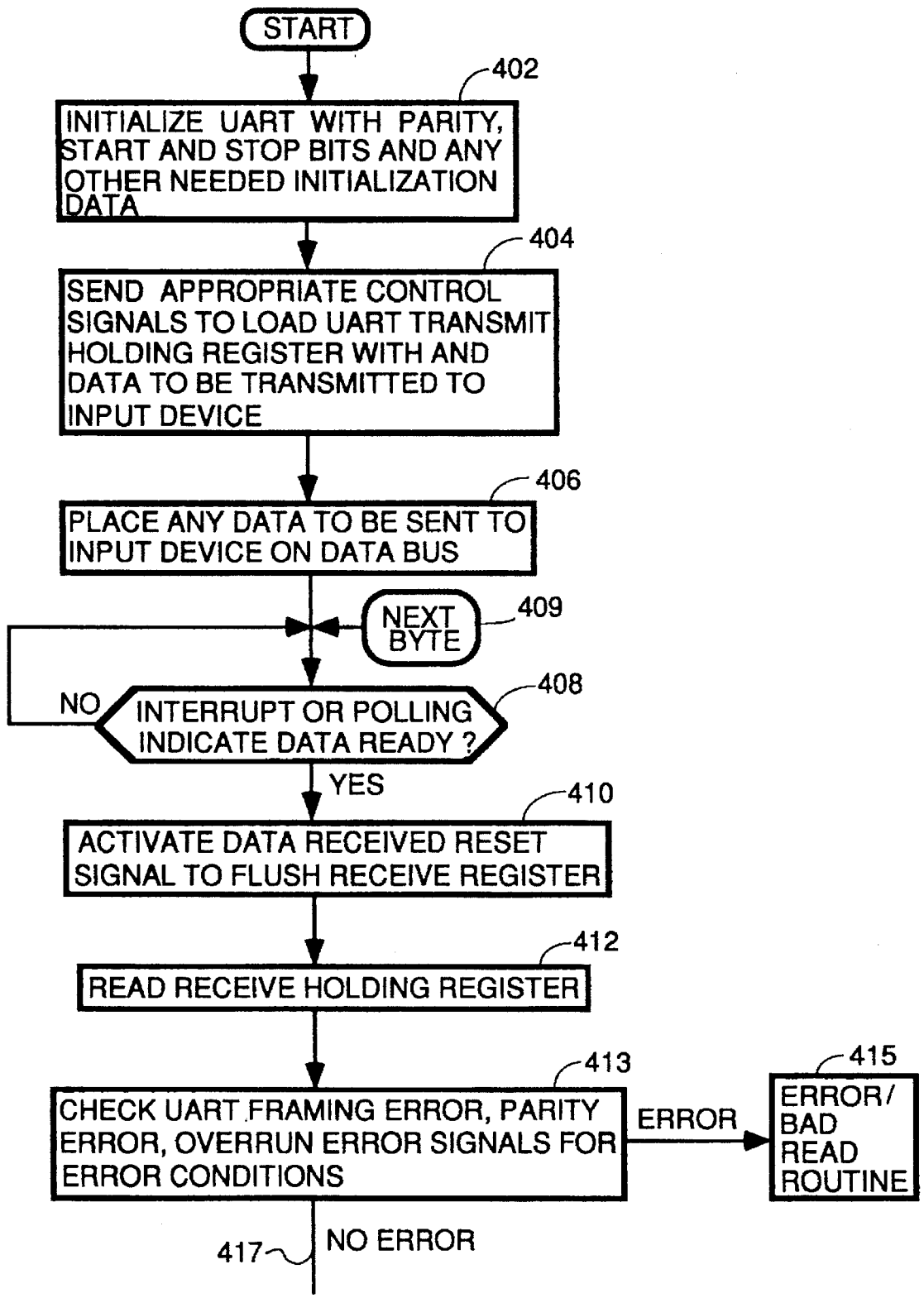
FIGS. 20A and 20B are a flowchart for the processing that occurs on the PC Card to receive serial format decoded data from an RS232 etc. output from an input device and transfer it to a PDA.
Figure 20B:
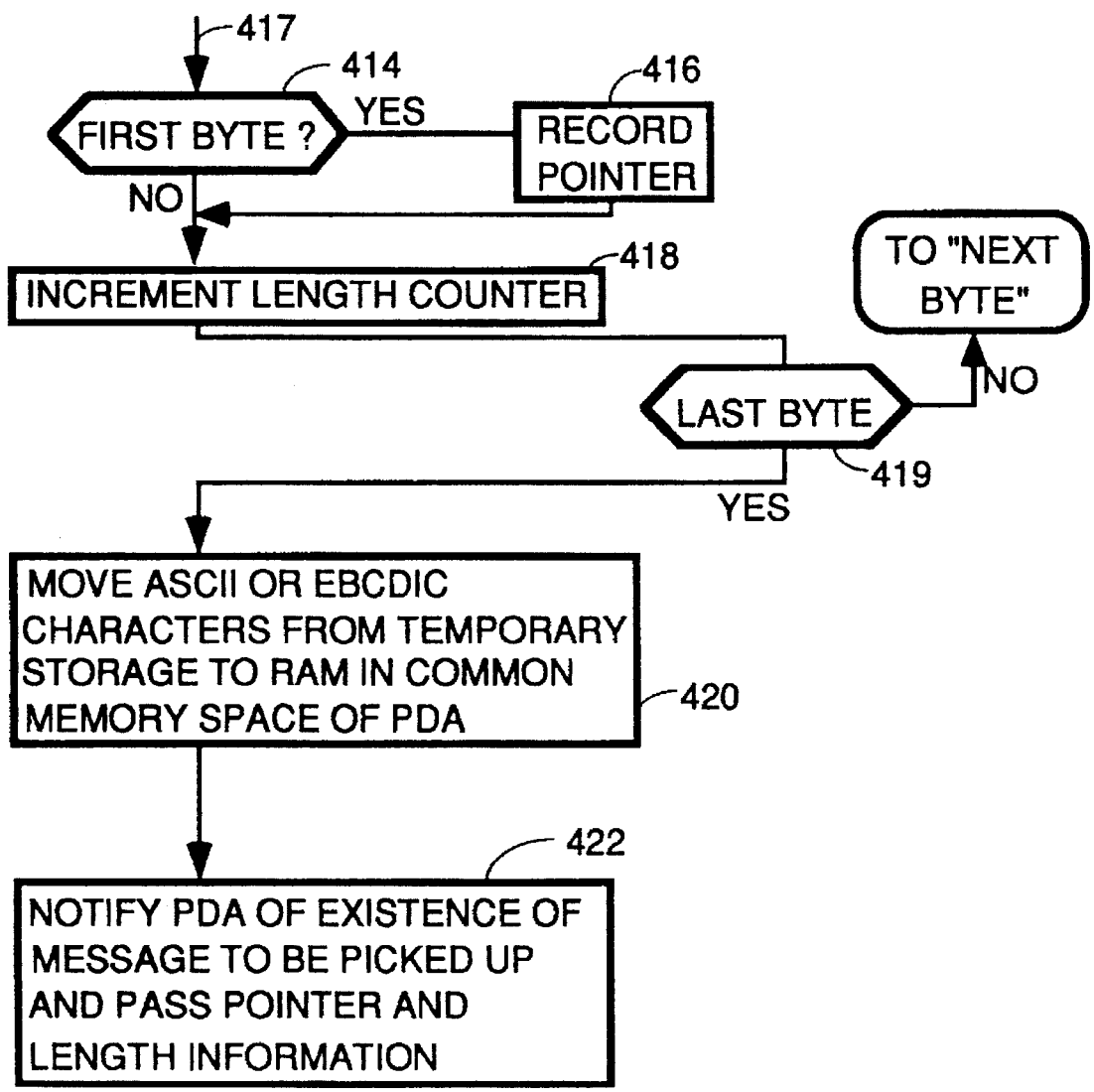

Referring to FIGS. 20A and 20B, there is shown a flow chart for the control process executed by microprocessor 38 to send data to and receive data from the input device via the UART 372. Block 402 represents the process of enabling and initializing the UART with data controlling whether parity is odd, even or not used, and controlling the number of start and stop bits to use in communicating with the input device 352. The UART is enabled by writing its address on address bus 52 thereby causing the address decode circuit to activate the chip select signal on line 384. Data is loaded into the transmit holding register by checking the status of a Transmit Holding Register Empty signal on control bus 380, and if the register is empty, placing the data to be sent to the input device on the data bus 50 (block 406) and activating a Transmit Holding Register Load signal on control bus 308. The UART then automatically performs any necessary handshaking with the input devices 352 such as activating a Request to Send line on bus 370 and waiting for the input device 352 to activate the Clear to Send control signal on bus 370. The data is then output serially at the transmit clock rate on a Transmit Data line of bus 370 by shifting it out of a parallel-in-serial-out shift register within UART/ACIA 372 coupled to line 374.

The data to be sent to the input device depends upon the input device but can include a control bit to start scanning or other data processing therein. Typically scanning or other processing is controlled by the microprocessor 38 under control of the client application 92 in FIG. 5. When the client application directs the input device to start processing, microprocessor 38 applies power thereto via switch 194 and processing automatically starts. Alternatively, power can be applied, and then the microprocessor sends a bit or control byte to the input device via steps 404 and 406 to start transmission of data to the PC Card after initialization of the UART/ACIA. In alternative embodiments, the microprocessor 38 can automatically apply power to the input device via switch 194 when the PC Card is inserted in its socket and the input device 352 can operate autonomously and gather data and generate an interrupt or set a "data waiting" status bit when data has been collected and is waiting for reading by the microprocessor 38.

The input device 352 typically works autonomously with the UART/ACIA to transmit data destined for microprocessor 38 to the UART/ACIA 372. Typically, the input device will gather data by reading a magnetic strip, scanning a barcode, reading a MICR character etc. and then activate a Request to Send signal line on bus 370. When the UART activates a Clear to Send line on bus 370, the data is transmitted serially to the UART/ACIA where it is shifted into a serial-in-parallel-out shift register within the UART/ACIA. The UART/ACIA 372 then loads the received data in parallel format to a Receive Holding Register within the UART and activates Data Received control/interrupt signal on control bus 380 or as a separate interrupt signal line (not shown). The Data Received signal can be used to set a bit in a register which is periodically polled by microprocessor 38 via data bus 50. The process of waiting for such an interrupt or periodically polling for a change in status of a bit set by the Data Received signal is symbolized by test 408 of FIG. 20A. The process symbolized by block 410 represents the process of activating the Data Received Reset signal on control bus 380 to flush the Receive Register internal to the UART/ACIA 372 to prepare it to receive the next byte. The process of block 412 is then performed to read the Receive Holding Register via data bus 50 and temporarily store it in a register or scratchpad RAM in microprocessor or load the data into RAM#1.

Block 413 represents the process of reading the various error signals generated by the UART/ACIA on the control bus 380 to determine if any error has occurred such as framing, parity, overrun etc. If an error has occurred, the process symbolized by block 415 is performed to perform error recovery, indicate a bad read, request retransmission or any combination of the above. If no error has occurred, path 417 is taken to step 414 on FIG. 20B.

If this is the first data byte received, step 414 detects this fact and processing is vectored to step 416 where a pointer address to the location of this first byte in RAM#1 or RAM#2 is recorded. Step 418 is then performed to increment a length counter (count kept in either software or hardware) which is used to record data that will be later used to tell the PDA how many bytes to read to get the complete message.

The test of block 419 generally represents the process of determining if any further data bytes are to be forthcoming. This can be by a timeout, a signal from the input device, a lack of activity etc. If the last byte has been received, the process of block 420 is performed although in some embodiments, each byte will be transferred into common memory and the PDA notified to pick it up without waiting for receipt of all bytes. If the last byte has not been received, processing flows to the "Next Byte" label on FIG. 20A to pick up the next byte from the UART/ACIA Generally, an input device which outputs its data on a EIA standard serial port, at least in the case of a barcode scanning engine, will have already decoded the barcode, and the serial output data will be ASCII, EBCDIC or characters from some other standard code set. In case the bits being output serially are not decoded, processing then proceeds to the type of decoding processes previously described for raw "image" data. It will be assumed in the process symbolized by FIG. 20A and FIG. 20B that the serial input data has already been decoded and is ASCII characters.

Assuming the data has not already been stored in RAM#2, the microprocessor 38 now moves the data from wherever it was temporarily stored in step 412 to RAM#2 in the shared memory space of the PDA in preparation for transfer to the PDA. This process is symbolized by step 420. In the embodiment of FIG. 12, this step involves asserting the Ready/Busy signal to lock out the PDA from the shared buses 232 and cause the bus multiplexer 212 to coupled address bus 52 to shared address bus 232 and coupled data bus 50 to shared data bus 234. The microprocessor 38 then selects RAM#2 by writing an address therein onto address bus 52 and loads the data to be transferred onto data bus 50 and activates suitable control signals to place RAM#2 in write mode via bus 240.

The microprocessor 38 then notifies the PDA 26 that there is a message to be picked up in RAM#2 (or RAM 50 in the case of an embodiment using the structure of FIG. 3) and passes to the PDA a pointer address indicating where the message starts and length information indicating how many bytes are in the message.

Figure 21:
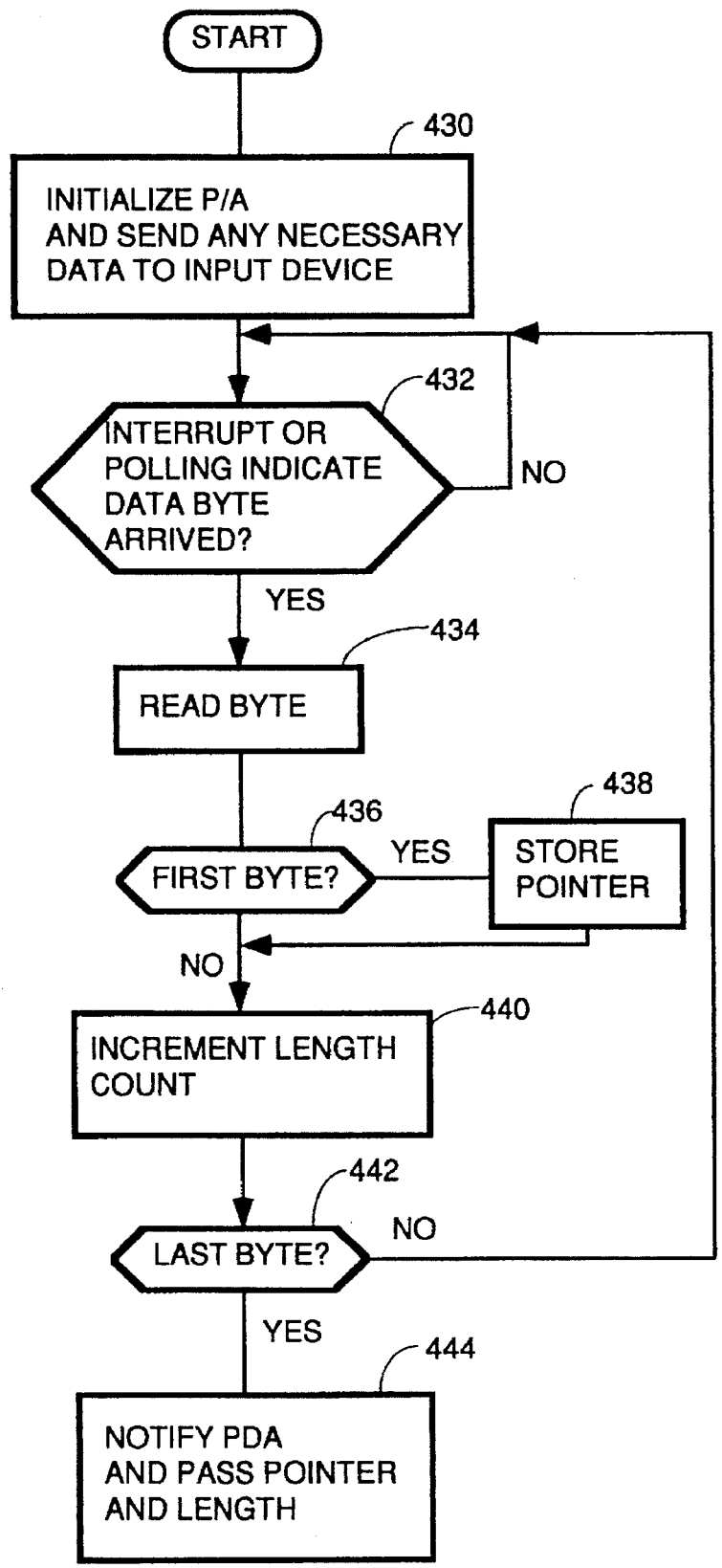
FIG. 21 is a flowchart of the processing on a PC Card that receives parallel format decoded output from an input device and transfers it to the PDA.

Referring to FIG. 21, there is shown a flowchart for the processing performed by microprocessor 38 in controlling PIA 386 and using it to communicate with the input device. Block 430 represents the process of initializing the PIA by writing suitable control bits on data bus 50 and suitable control bits on control bus 380 to program the A and B ports of the PIA according to the needs of the particular input device selected for coupling to the PIA. Block 430 also represents the process of sending any necessary data to the input device to control its operations to start gathering data. Some input devices will require no data be sent from the microprocessor 38.

Typically, the input device 352 and the PIA will work autonomously together to transfer data between themselves. For example, after the input device has been powered, it begins gathering data as previously described and when data is ready for transfer to the PIA, an interrrupt will be generated on bus 370, usually in the form of activation of the CA1 signal (not separately shown) on bus 370 and loading of the data byte to be transferred in parallel on the eight (or 16 etc.) parallel lines of the data path within bus 370. This data gets latched into a parallel lcad register within PIA 386. An interrupt will be generated by the PIA on line 390 when a byte has been latched into the PIA and the input device has activated the CA1 signal line. The test of 432 in FIG. 21 symbolizes the process of receiving this interrupt or polling for a changed status bit in one of the PIA control registers indicating a byte is waiting to be read.

Block 434 represents the process of reading the byte that was latched into the PIA from the input device and temporarily storing it. In some embodiments, since the received byte is assumed to be already decoded and the input device is assumed to already have error checked it, the byte will be immediately written into the common memory space and the PDA will be notified of its existence and where to read it. In the embodiment symbolized by FIG. 21, the byte is immediately stored in RAM#2 in the common memory space as are all subsequent bytes until a complete message is received. In other embodiments, the complete message will be stored in RAM#1 and then moved into RAM#2 and the PDA notified only after the complete message is received.

Block 436 represents the process of determining if the byte received was the first byte. If it was, the process of block 438 is performed to store a pointer indicating the address in RAM#2 in which the first byte was stored, and then the process of block 440 is performed to increment the length count. If the byte received is not the first byte, processing flows directly from step 436 to 440 to increment the length count.

The process of block 442 represents the determination of whether the last byte was received either by receipt of a signal from the input device, counting a known number of bytes that are to be sent or some other suitable methodology. If the byte received was not the last, processing vectors to block 432 to wait for the next interrupt or polling indication of the arrival of a new byte. If the test of block 442 indicates that the byte received was the last byte, block 444 is performed to notify the PDA and pass it the pointer and length information. The PDA then performs sufficient memory cycles on shared memory RAM#2 to retrieve the entire message and pass it to the client application 92.

In alternative embodiments for a PC Card interface where the input from the barcode scanner is undecoded 1's and 0's defining a binary "image" of the transitions (HHLC) and where the decoding of the "image" is to be done in the PDA instead of the PC Card, a two different interface configurations are used. In the first configuration, the circuitry is the same as defined in FIGS. 3 or 8, but the software is different. Basically, the software for this embodiment of interface will sample the input signal line from the receiver/buffer 36 and then simply store this data in RAM 50 or RAM#1 or RAM#2 in FIFO fashion while storing a pointer to where the image data starts and how long it is. The PDA will then be informed of the existence, location and length of the image data and will retrieve it in a plurality of memory cycles. The client application 92 running on the PDA microprocessor (or another separate decoding process) will decode the "image" data in the manner described above in, for example, FIGS. 6A, 6B and 6C, and pass the decoded alphanumeric characters to the client application in execution on the PDA that needs the data.

The second configuration for an interface where the PDA does the decoding substitutes a DMA device for the microprocessor. In addition, any additional logic necessary to perform the control functions the microprocessor 38 performs which cannot be performed by the DMA device will be added. The DMA device will receive data from the input device by interrupt processing etc. and store it in RAM within the Common Memory Space shared by the PDA. The DMA device or its supporting control logic will then notify the PDA of the existence, location and length of the binary "image" data and the PDA will decode it using a process like those previously described and pass the decoded alphanumeric characters to whatever client application running on the PDA, a network server somewhere else or by modem to another process in execution elsewhere.

There are no known barcode scanner interfaces to PDA's which utilize the PCMCIA defined PC Card standard. Current portable barcode scanning systems are all proprietary, custom designed systems which are not compatible with hardware or software manufactured by other manufacturers. Users are thus locked into the offerings of only one manufactures which may not fulfill their current or future needs. This proprietary prior art technology is typified by the portable barcode scanning systems offered by Symbol Technologies Inc. and Telxon.

Another significant advantage of using a PC Card interface for barcode scanners and other types of input devices is the ease and rapidity with which a malfunctioning system can be repaired. Because PC Cards are removable, a malfunctioning barcode reader can be simply removed from the system by pulling out the PC Card to which the barcode reader is attached and replacing the unit with another that is known to be good. The defective unit can then be repaired at a more leisurely pace without completely disrupting portable barcode scanning operations.

Another advantage of a PC Card interface for an Input device is the ability to simultaneously expand the memory capacity of the PDA in single PC Card slot PDA's. There are many PC Cards currently available which serve the sole purpose of expanding the rather limited memory capacity of some PDA's or providing network connectivity or modem capability. This allows more complex processing to be performed with larger programs.

Another advantage of using a PC Card interface for an input device is the execute in-place capability of PC Cards. This capability means that the software or data encoded in a PC Card's memory can be executed or accessed directly from the memory of the PC Card without first downloading it into the PDA memory. This means that there need be no concern that the code implementing the interface for whatever input device is connected to the PDA will be too large to fit into the PDA memory or that the data defining the "image" or decoded message data will be too large to fit in the PDA memory.

Referring again to FIG. 12, there are shown two additional circuits which are useful to add functionality to the PDA and improve user feedback for communication functions or barcode scanning or gathering of other data from the input device 352. A modem 450 coupled to the data bus 50 and the control bus 380 can be used to output the decoded alphanumeric characters or binary "image" data via phone line 452 to a process in execution remotely. Such PC Card modem technology is commercially available from Cirrus Logic as model number CL-MD9624ECP/MD1414ECP, the details of which are hereby incorporated by reference. The modem design is not critical to the invention, and the PC Card modems available any one of numerous manufacturers will suffice. For example, modems from Advance Circuits, Inc. of Minnetonka, Minn., AMT International Industries, Inc. of Huntington Beach, Calif. or any of the other manufacturers of PC Card modems listed in the PCMCIA Reference Book of Spring 1994 (hereby incorporated by reference) will suffice. The details of these modems are hereby incorporated by reference. The modem 450 can be included within the circuits of FIGS. 3 or 8 as well in alternative embodiments as can headphone interface 454. In addition, modem 450 can be a cellular modem of any of the types which are currently commercially available from the sources listed in the PCMCIA Resource Reference Book of Spring 1994. The details of these cellular modems is hereby incorporated by reference.

In addition, a headphone interface 454 coupled to a headset 456 or headset jack provides audible feedback signals to the user for such events as successful decode tones, dial tone received by the modem 450, DTMF dialing tones, ringing sounds, answering modem tones or carrier detected by modem 450. The modem outputs audio signals to the headphone interface 454 via line 458. The headphone interface is also connected to a pin in the parallel output port of the microprocessor 38 by line 464 to receive a signal indicating either a successful decode or a bad read. Typically, the microprocessor 38 will change the logic state of the line 458 at a first audible frequency rate upon achieving a successful decode and will change the logic state of line 464 at a second audible frequency rate upon detection of a bad read. The headphone interface 454 provides buffering and amplification for the signals on lines 464 and 458 and applies the amplified signals to the headset 456 via line 460.

Although the invention has been described in terms of the preferred and alternative embodiments disclosed herein, those skilled in the art will appreciate other alternative embodiments that do not depart from the spirit and scope of the teachings of the invention. All such embodiments are intended to be included within the scope of the claims appended hereto.

What is claimed is:

1. An interface on a PCMCIA defined PC Card between an input device that can scan a barcode and a host device with a PCMCIA slot such as a personal digital assistant, palmtop computer or other computing device, comprising:

an input port on said PC Card for coupling to an input device that can scan barcodes having light and dark spaces;

memory means for storing data;

means for sampling logic signals from said input device, said logic signals appearing at said input port and for storing in said memory means an "image" of said barcode recording at least the relative spacing between the transitions between said dark and light spaces in a barcode scanned by said input device;

means for accessing said image data in said memory means and decoding therefrom alphanumeric characters encoded in said barcode;

means for temporarily storing in said memory means said decoded alphanumeric characters along with pointer data and length data indicating, respectively, the location in said memory means of said alphanumeric characters and the number of addresses in said memory means that must be read to retrieve all said alphanumeric characters;

means for cutting off power to said barcode scanning mechanism in said input device after a successful decoding operation;

means for notifying said host device of the existence in said memory means of said alphanumeric characters and passing to said host device said pointer and length information, and for providing access to said alphanumeric characters to said host device when requested by said host device.

2. An interface circuit for interfacing an input device such as a barcode reading device to a host computer such as a palmtop computer, personal digital assistant, desktop computer or other host having a PCMCIA slot having a PCMCIA bus connector and programmed by PCMCIA driver software to perform input/output transactions with said interface circuit through said PCMCIA slot and said PCMCIA bus connector, comprising:

a PC card having integrated thereon a PCMCIA interface circuit having a PCMCIA bus and PCMCIA bus connector and having integrated thereon or attached thereto a housing for a barcode scanning device;

a barcode scanning device for scanning a barcode comprising a laser, scanning optics, a photodetector, and a comparator coupled to receive the analog output of said photodetector and convert said analog output to an undecoded HHLC signal, said laser, scanning optics, photodetector and comparator coupled in conventional manner to each other and mechanically supported by said housing;

and wherein said PCMCIA interface circuit comprises:
a memory for storing digital data;
decoding circuitry coupled to said comparator of said barcode scanning device and to said PCMCIA bus connector of said PC card, for receiving the undecoded HHLC signal from said comparator, said HHLC pattern defining a pattern of a barcode, and for decoding said HHLC signal to generate a plurality of alphanumeric characters from a code set used by said host computer, and for generating a data ready signal indicating decoded characters are ready for retrieval by said host computer and communicating said data ready signal to said host computer;

a switch controlled by said decoding circuitry for cutting off power to said barcode scanning device after a successful decoding operation;

input/output circuitry coupled to said decoding circuitry for transferring said alphanumeric characters to said host computer through said PCMCIA bus connector of said PC card and the mating PCMCIA bus connector of said host computer.

3. The apparatus of claim 2 wherein said PCMCIA interface circuit further comprises a wireless local area network interface for transmitting said decoded alphanumeric characters to a host computer via said wireless local area network interface.

4. The apparatus of claim 2 further comprising a local area network interface means coupled to said PCMCIA interface circuit for communicating characters decoded from said barcode on a local area network.

5. The apparatus of claim 2 wherein said decoding circuitry includes a microprocessor coupled to receive said undecoded HHLC signal from said barcode scanning device, processing of said microprocessor being controlled by a control program, said control program comprising:

first means for controlling said microprocessor to sample said undecoded HHLC signal and store digital sample data in a memory, said sample data encoding the spatial relationships between transitions between light and dark areas in said barcode;

second means for controlling said microprocessor to retrieve said sample data stored by said first means and decode said sample data to derive said one or more alphanumeric characters encoded therein and generating a successful decode signal;

means coupled to said switch and said second means for determining when a successful decoding operation has been performed and for controlling said switch so as to cause said switch to cut off power to paid barcode scanning device; and third means for controlling said microprocessor to determine when a successful decoding operation has been carried out by said second means as indicated by the presence of said successful decode signal and to generate said data ready signal and communicate said data ready signal to said host computer to indicate alphanumeric characters are available for retrieval and use by said host computer.

6. An interface circuit for interfacing an input device such as a barcode reading device to a host computer such as a palmtop computer, personal digital assistant, desktop computer or other host having a PCMCIA slot having a PCMCIA bus connector and programmed by PCMCIA driver software to perform input/output transactions with said interface circuit through said PCMCIA slot and said PCMCIA bus connector, comprising:

a PC card having integrated thereon a PCMCIA interface circuit having a PCMCIA bus and PCMCIA bus connector and having integrated thereon or attached thereto a housing for a barcode scanning device;

a barcode scanning device for scanning a barcode comprising a laser, scanning optics, a photodetector, and a comparator coupled to receive the analog output of said photodetector and convert said analog output to an undecoded HHLC signal, said laser, scanning optics, photodetector and comparator coupled in conventional manner to each other and mechanically supported by said housing;

and wherein said PCMCIA interface circuit comprises:
a memory for storing digital data including PC Card Information Structure data that defines the formatting and organization of data stored on said PC card, and including Configuration Option data, and Card Configuration and Status data;

decoding circuitry coupled to said comparator of said barcode scanning device and to said PCMCIA bus connector of said PC card, for receiving the undecoded HHLC signal from said comparator, said HHLC pattern defining a pattern of a barcode, and for decoding said HHLC signal to generate a plurality of alphanumeric characters from a code set used by said host computer, and for generating a data ready signal indicating decoded characters are ready for retrieval by said host computer and communicating said data ready signal to said host computer;

input/output circuitry coupled to said decoding circuitry for transferring said alphanumeric characters to said host computer through said PCMCIA bus connector of said PC card and the mating PCMCIA bus connector of said host computer;

and wherein said memory comprises:

random access memory and one or more registers mounted on said PC card, said registers for storing configuration data such as said PC Card Information Structure data that defines the formatting and organization of data stored on said PC card, said Configuration Option data, and said Card Configuration and Status data, and said random access memory for storing said decoded alphanumeric characters generated by said decoder, the addresses of said random access memory being mapped into a Common Memory Address Space of said PCMCIA driver software of said host and said registers being mapped into an Attribute Memory Space of said PCMCIA driver software; and nonvolatile memory mounted on said PC card for storing program instructions;

and wherein said PCMCIA interface circuit further comprises:

a buffer amplifier coupled to said comparator of said barcode scanning device, to receive said HHLC signal and do any necessary voltage level conversions to make the HHLC signal compatible for sampling by said PCMCIA interface circuit;

a microprocessor having an input port coupled to said buffer amplifier, and having shared address, control and data buses coupled to said random access memory and said nonvolatile memory, and coupled to said PCMCIA bus connector, said microprocessor programmed to sample said HHLC signal output by said buffer amplifier so as to generate a plurality of digital samples and store said samples, or a compressed version thereof, in said random access memory as data defining the light and dark pattern of said barcode scanned by said barcode scanning device, and said microprocessor also programmed to decode said data stored in said random access memory defining said pattern of said barcode into one or more of said printable and unprintable decoded characters, and said microprocessor also programmed to generate said data ready signal for communication to said host through said PCMCIA bus indicating that one or more decoded characters are ready to be input to said host through said PCMCIA bus;

and wherein said PCMCIA driver software is stored in a memory of said host or in said random access memory or nonvolatile memory on said PC card, and is configured to control said host to determine the status said data ready signal from said microprocessor indicating when decoded data from the barcode scanning operation is ready for input through said PCMCIA bus and to control said host so as to perform an input/output operation to read into said host the decoded character via said PCMCIA bus and said shared address, control and data buses, and wherein said PCMCIA driver software is also configured to control said host to store said retrieved decoded character(s) data in a memory.

7. The apparatus of claim 6 wherein said microprocessor stores said decoded character(s) in a memory on said PC card, and wherein said data ready signal communicated by said microprocessor to said host computer is an interrupt which causes said host computer to execute an interrupt service routine to retrieve pointers to the starting address in said random access memory where the decoded character(s) are stored and to retrieve length information indicating how many storage locations of said random access memory need to be read to access the decoded character(s).

8. An interface circuit for interfacing an input device such as a barcode reading device to a host computer such as a palmtop computer, personal digital assistant, desktop computer or other host having a PCMCIA slot having a PCMCIA bus connector and programmed by PCMCIA driver software to perform input/output transactions with said interface circuit through said PCMCIA slot and said PCMCIA bus connector, comprising:

a PC card having integrated thereon a PCMCIA interface circuit having a PCMCIA bus and PCMCIA bus connector and having integrated thereon or attached thereto a housing for a barcode scanning device;

a barcode scanning device for scanning a barcode comprising a laser, scanning optics, a photodetector, and a comparator coupled to receive the analog output of said photodetector and convert said analog output to an undecoded HHLC signal, said laser, scanning optics, photodetector and comparator coupled in conventional manner to each other and mechanically supported by said housing;

and wherein said PCMCIA interface circuit comprises:

a memory for storing digital data including PC Card Information Structure data that defines the formatting and organization of data stored on said PC card, and including Configuration Option data, and Card Configuration and Status data;

decoding circuitry coupled to said comparator of said barcode scanning device and to said PCMCIA bus connector of said PC card, for receiving the undecoded HHLC signal from said comparator, said HHLC pattern defining a pattern of a barcode, and for decoding said HHLC signal to generate a plurality of alphanumeric characters from a code set used by said host computer, and for generating a data ready signal indicating decoded characters are ready for retrieval by said host computer and communicating said data ready signal to said host computer;

input/output circuitry coupled to said decoding circuitry for transferring said alphanumeric characters to said host computer through said PCMCIA bus connector of said PC card and the mating PCMCIA bus connector of
said host computer;

and wherein said decoding circuitry includes a microprocessor coupled to receive said undecoded HHLC signal from said barcode scanning device, processing of said microprocessor being controlled by a control program, said control program comprising:

first means for controlling said microprocessor to sample said undecoded HHLC signal and store digital sample data in a memory, said sample data encoding the spatial relationships between transitions between light and dark areas in said barcode;

second means for controlling said microprocessor to retrieve said sample data stored by said first means and decode said sample data to derive said one or more alphanumeric characters encoded therein and generating a successful decode signal; and third means for controlling said microprocessor to determine when a successful decoding operation has been carried out by said second means as indicated by the presence of said successful decode signal and to generate said data ready signal and communicate said data ready signal to said host computer to indicate alphanumeric characters are available for retrieval and use by said host computer;

and further comprising means coupled to said first means to determine when undecoded HHLC signals are being received from said barcode scanning device and to control said microprocessor to seize control of said PCMCIA bus on said PC Card so said host computer cannot have access to said PCMCIA bus, and further comprising data flush means coupled to said first means for controlling said microprocessor to determine the amount of digital sample data stored by said first means, and wherein said second means comprises:

signalling means coupled to said third means for controlling said microprocessor to drive an indicator mechanism to create a first humanly perceptible signal when a successful decoding process has been carried out;

autodiscrimination means coupled to said signalling means for controlling said microprocessor to examine start and stop characters encoded in said sample data stored by said first means to determine what type of barcode was scanned, and for vectoring processing by said microprocessor to a decode routine in said second means which is appropriate to the type of barcode scanned as indicated by said start and stop characters, and, if said start and stop characters indicate the type of barcode scanned is not recognized or there is no appropriate decode routine, for causing said data flush means to remove said sample data;

direction determination means for controlling said microprocessor to determine the direction of scan by examining said start and stop characters and for controlling said microprocessor to reverse the order of any alphanumeric characters decoded from said sample data if said barcode was scanned in the reverse direction;

run length calculation means for controlling said microprocessor to examine said sample data and determine the ratios of run lengths of logic 1's to logic 0's, and if the ratios cannot be calculated or are not within acceptable limits for the type of barcode scanned, for causing said data flush means to remove said sample data;

decoding means for controlling said microprocessor to examine the run lengths determined by said run length calculation means and decode the ratios using an algorithm appropriate for the type of barcode scanned to derive one or more alphanumeric characters encoded therein and to cause said third means to generate said data ready signal if one or more alphanumeric characters was successfully decoded by said second means, and, if the decoding process is unsuccessful, for causing said data flush means to remove said sample data.

9. The apparatus of claim 8 wherein said second means further comprises:

means for filtering out any unwanted portions of the decoded alphanumeric characters derived by said second means and for appending any desired suffix characters or prefix characters to the string of decoded alphanumeric characters;

and wherein said third means further comprises:

means for cutting off power to said barcode scanning device after a successful decoding process carried out by said second means;

means for storing said one or more alphanumeric characters decoded by said second means in said memory on said PC Card as a data message and recording a pointer to the starting address in said memory where storage of said one or more decoded alphanumeric characters of said data message starts and recording length data regarding the number of alphanumeric characters stored as said data message;

means for controlling said microprocessor to generate an interrupt signal as said data ready signal and transmit said interrupt signal to said host computer and pass to said host computer said pointer to where said decoded alphanumeric characters are stored and said length data; and means for releasing said PCMCIA bus for use by said host computer in retrieving said decoded alphanumeric characters after generation of said data ready signal.

10. An interface circuit for interfacing an input device such as a barcode reading device etc. to a palmtop computer, personal digital assistant, desktop computer or other host computer having a PCMCIA slot having a PCMCIA bus connector and programmed by PCMCIA driver software to perform input/output transactions with said interface circuit through said PCMCIA slot and said PCMCIA bus connector, hereafter called the host, comprising:

a PC card having integrated thereon a PCMCIA interface circuit having a PCMCIA bus and PCMCIA bus connector and having integrated thereon or attached thereto a housing for a barcode scanning device;

a barcode scanning means for scanning barcodes and outputting an undecoded HHLC or wand signal defining the pattern of light and dark areas of a barcode sensed by said barcode scanning means;

and wherein said PCMCIA interface circuit comprises:

a decoder circuit coupled to said barcode scanning means and to said PCMCIA bus connector, for receiving the undecoded HHLC or wand signal from said barcode scanning means defining a pattern of a barcode, and for decoding said pattern data into various printable and/or unprintable characters from a code set used by said host, and for automatically providing access to said characters decoded from said barcode to said host computer after notifying said host computer of a successful decoding operation and for automatically shutting off power to said barcode scanning means after a successful decoding operation.

11. The apparatus of claim 10 further comprising memory means in said PCMCIA interface circuit, and wherein said decoder circuit includes means for storing decoded characters in said memory means and for notifying said host when one or more decoded characters have been stored in said memory means.

12. An apparatus comprising:

a PC Card having a port for receiving undecoded barcode data from a barcode reading device and having a PCMCIA bus and PCMCIA connector coupled to said bus, said PC Card, PCMCIA bus and PCMCIA connector being electrically and mechanically in conformity with either a PCMCIA Type II or Type III standard as that standard existed at the time this patent application was filed, said PC Card including circuitry for sampling said undecoded signal from said barcode scanning device and storing digital pattern data representing at least the spatial relationships between the transitions in the light and dark patterns of said barcode in a memory on said PC Card and for generating a signal indicating when said digital data has been stored;

a computer having an interface including a PCMCIA slot having a PCMCIA bus connector therein which can mate with said PCMCIA connector on said PC Card, said interface for making physical and electrical connection to said PCMCIA connector and PCMCIA bus of said PC Card, said physical and electrical connection to said PC Card in accordance with with the PCMCIA Type II or Type III standard as said Type II or Type III standard existed at the time this patent application was filed, said computer having a microprocessor processing of which is controlled by a control program, said control program for receiving said signal from said PC Card that said digital pattern data recording the transitions in the light and dark patterns of said barcode is ready for decoding and is stored on said PC Card and for retrieving said digital pattern data and decoding said digital pattern data to derive one or more alphanumeric characters encoded therein;

and wherein said PC Card is structured to provide access by said computer to a second expansion memory on said PC Card while the processes of receiving and decoding of said digital pattern data is occurring, said memory serving as expansion memory for storing data and/or program instructions needed by said computer.

13. An apparatus comprising:

a PC Card having a port for receiving undecoded barcode data and having a PCMCIA bus and PCMCIA connector coupled to said bus, said PC Card, PCMCIA bus and PCMCIA connector being electrically and mechanically in conformity with either a PCMCIA Type II or Type III standard as that standard existed at the time this patent application was filed, said PC Card including circuitry for sampling said undecoded signal from said port and storing digital pattern data representing the spatial relationships between the transitions between light and dark areas in said barcode and for generating a signal indicating when said digital pattern data has been stored, and having a housing physically attached to said PC Card and big enough to enclose a barcode scanning device;

a barcode scanning device supported by said housing and coupled to said port of said PC Card, for scanning barcodes and generating said undecoded signal and transmitting said signal to said port;

a computer having an interface including a PCMCIA slot having a PCMCIA bus connector therein which can mate with said PCMCIA connector on said PC Card, said interface for making physical and electrical connection to said PCMCIA connector and PCMCIA bus of said PC Card, said physical and electrical connection to said PC Card in accordance with the PCMCIA Type II or Type III standard as said standard existed at the time this patent application was filed, said computer having a microprocessor processing of which is controlled by a control program, said control program for receiving said signal from said PC Card that said pattern data has been stored on said PC Card and for retrieving said data and decoding said data to derive one or more alphanumeric characters encoded therein;

and wherein said PC Card has a switch controlled by said control program which is coupled so as to cut off power to said barcode scanning device when a shutdown signal is received from said computer, and wherein said control program includes instructions to cause said computer to generate said shutdown signal and transmit it to said switch when said control program has successfully decoded said digital pattern data.

14. An apparatus comprising:

a PC Card means having a port for receiving undecoded barcode data from a barcode reading device and having a PCMCIA bus and PCMCIA connector coupled to said bus, said PC Card, PCMCIA bus and PCMCIA connector being electrically and mechanically in conformity with either a PCMCIA Type II or Type III standard as that standard existed at the time this patent application was filed, said PC Card means for sampling said undecoded signal from said barcode scanning device and storing digital pattern data representing the spatial relationships between the transitions in said barcode and for generating a signal indicating when digital pattern data has been stored;

computer means having an interface including a PCMCIA slot having a PCMCIA bus connector therein which can mate with said PCMCIA connector on said PC Card means, said interface for making physical and electrical connection to said PCMCIA connector and PCMCIA bus of said PC Card, said physical and electrical connection to said PC Card in accordance with either the PCMCIA Type II or Type III standard as it existed at the time this patent application was filed, said computer means having a microprocessor processing of which is controlled by a control program means, said control program means for receiving said signal from said PC Card indicating that said digital pattern data is ready for decoding and is stored on said PC Card and for retrieving said digital pattern data and decoding said digital pattern data to derive one or more alphanumeric characters encoded therein.

15. A PC card interface to couple an input device to a host computer such as a palmtop or personal digital assistant, comprising:

an input device port for coupling to an input device;

a first random access memory having address and data ports and a chip select input;

a nonvolatile memory having address and data ports and a chip select input;

a second random access memory having address and data ports and a chip select input;

a bus multiplexer having first and second address input ports, and having first and second data input ports, and having first and second chip select input ports, and having a shared address output port, and having a shared data output port, and having shared chip select outputs, and having a selection control input for receiving a signal controlling whether said first or second data input ports are coupled to said shared data output port and controlling whether said first or second address input port is coupled to said shared address port, and controlling whether said first or second chip select input port is coupled to said shared chip select output port;

a shared address bus coupling said address port of said second random access memory to said shared address output port of said bus multiplexer;

a shared data bus coupling said data port of said second random access memory to said shared data port of said bus multiplexer;

a chip select signal bus coupling said shared chip select output port of said bus multiplexer to said chip select input port of said second random access memory;

a PCMCIA connector coupled to a handshaking bus including a ready/busy signal line coupled to supply said ready/busy signal as said selection control signal to said selection control input of said bus multiplexer, and coupled by a first data bus to said first data input ports of said bus multiplexer, and coupled by a first address bus to said first address input ports of said bus multiplexer;

a programmed microprocessor having an address port coupled via a second address bus to said address ports of said first random access memory and said nonvolatile memory and to said second address input ports of said bus multiplexer, and having a data port coupled via a second data bus to said data ports of said first random access memory and said nonvolatile memory and to said second data input ports of said bus multiplexer, and having a control port coupled to a control bus, and having a parallel data port at least one line of which is coupled to receive data from said input device port and one or more lines of said parallel port being coupled to said handshake bus coupled to said PCMCIA connector, and having a port coupled to said ready/busy signal line of said handshaking bus, said microprocessor programmed to receive undecoded data from any input device coupled to said input device port, decode the data into one or more alphanumeric characters and store said one or more alphanumeric characters in said first random access memory via said second address and data buses, and when storage of said alphanumeric characters in said first random access memory is complete, and programmed to read said one or more alphanumeric characters from said first random access memory, and programmed to assert said ready/busy signal so as to cause said bus multiplexer to couple said second address bus to said shared address bus and to couple said second data bus to said shared data bus, and programmed to write said one or more alphanumeric characters into said second random access memory, and programmed to generate a signal which notifies said host computer that one or more decoded alphanumeric characters have been stored in said second random access memory for use by said host computer;

a first address decode circuit having a control input coupled to said control port of said microprocessor via said control bus, and having an address input coupled to said second address bus and having individual chip select output ports coupled by individual first chip select lines to said chip select inputs of said first random access memory and said nonvolatile memory, and to said first chip select input port of said bus multiplexer; and a second address decode circuit having a control input coupled to said handshaking bus coupled to said PCMCIA connector and having an address input coupled to said first address bus coupled to said PCMCIA connector, and having a one or more chip select output ports coupled by one or more second chip select output lines to said second chip select input port of said bus multiplexer;

and wherein when said programmed microprocess asserts said ready/busy signal, said bus multiplexer connects its first chip select port and a chip select signal from said first address decode circuit to said chip select input of said second random access memory.

16. An interface circuit on a PC Card for interfacing an input device such as a barcode scanning device, magnetic stripe reader etc. to a host computer such as a palmtop computer or personal digital assistant via a PCMCIA connector in a PCMCIA slot in said host computer, comprising:

a PC Card having a PCMCIA connector for coupling to said PCMCIA connector in said PCMCIA slot in said host computer and having a PCMCIA bus couple to said PCMCIA connector on said PC Card, said PC Card conforming electrically and mechanically to either the PCMCIA Type II or Type III standard as it existed at the time this patent application was filed, said PC Card further comprising:

first means for receiving undecoded or decoded data from an input device capable of reading a barcode, magnetic stripe or other machine readable indicia, said undecoded or decoded data being formatted in either serial or parallel data format;

memory means for storing data;

means coupled to said first means for receiving undecoded data from said input device and decoding said undecoded data into alphanumeric characters according to a decoding process suitable for the type of undecoded data received and for storing the decoded alphanumeric data in said memory means, and, in the case where said data received from said input device has already been decoded, for receiving the decoded alphanumeric data from said input device and storing said decoded alphanumeric data in said memory means, and, after storing said alphanumeric data in said memory means generating a signal or data that will be detected by said host computer indicating that alphanumeric data is waiting in said memory means for use by said host computer;

input/output means including said PCMCIA bus and said PCMCIA connector on said PC Card for connecting said microprocessor means and said memory means to said host computer via said PCMCIA slot, and for cooperating with said microprocessor means and said host computer to allow said host computer to learn from data generated by said microprocessor means that alphanumeric data is waiting in said memory means and allow said host computer to access said memory means and read said alphanumeric data stored therein.

17. A process for decoding undecoded output data from a barcode scanning device into characters in a code set used by a host computer, and inputting said characters into host computer through a PCMCIA slot, comprising the steps of:

receiving on a PC card that fits into the PCMCIA slot of said host computer undecoded data from a barcode scanning input device which processes a barcode;

decoding on said PC card characters in a code set used by said host computer from said undecoded data received from said barcode scanning device and storing said decoded characters in a memory on said PC Card;

computing a checksum from said decoded characters and comparing said checksum to a checksum encoded into said barcode; and transferring said decoded characters to said host computer through an electrical connection to said PC card made through said PCMCIA slot.

18. The process of claim 17 wherein said step of receiving undecoded data comprises the steps of:

energizing a barcode scanning device upon receipt of a signal from said host computer indicating barcode scanning is desired;

checking an input port coupled to said barcode scanning device to determine if electrical transitions are occurring on said input port, and, if so, for sampling said input port and storing in memory a sequence of logic 1's and 0's that define the spacing between transitions between light and dark areas of a scanned barcode; and computing the ratios of run lengths of at least some of the runs of logic 1's and logic 0's.

19. The process of claim 17 wherein said step of decoding alphanumeric characters from said undecoded input data comprises the steps of:

examining the ratios of run lengths of logic 1's and logic 0's in accordance with a code set comprised of predetermined unique combinations of run lengths that map to particular characters, at least some of which are alphanumeric, said code set being pertinent to the type of barcode scanned and determining the particular alphanumeric characters encoded in said run lengths.

20. The process of claim 18 wherein said step of decoding alphanumeric characters from said undecoded input data comprises the steps of:

examining said run lengths to locate start and stop characters;

determining from said start and stop characters which type of barcode was scanned;

determining the direction in which said barcode was scanned by determining whether said start or said stop character was received first; and using a code set appropriate to the barcode scanned to decode said run lengths into alphanumeric data, said code set comprised of predetermined unique combinations of run lengths that map to particular alphanumeric characters.

21. The process of claim 20 further comprising the step of signalling an unsuccessful decoding process and flushing said sample data and any stored alphanumeric characters from memory if it cannot be determined what type of barcode was scanned, or if the direction of scan cannot be determined, or if the run lengths of logic 1's and 0's are determined to be not legitimate, or if alphanumeric characters cannot be successfully decoded from said run lengths.

22. The process of claim 17 further comprising the step of recording in memory on said PC Card a pointer to the starting address in a memory on said PC Card where the first character of any decoded alphanumeric characters decoded from processing a barcode is stored and recording in memory on said PC Card length information indicating the number of sequential storage locations in memory on said PC Card which store said alphanumeric characters decoded from processing a barcode, and wherein the step of transferring said alphanumeric data to said host computer comprises the steps of:

generating on said PC Card an interrupt request when successful decoding has occurred to interrupt said host computer performing an interrupt service routine in said host computer which retrieves from memory on said PC Card said pointer to the starting address in a memory on said PC Card where the first character of any decoded alphanumeric characters decoded from a barcode is stored and which retrieves said length information indicating the number of sequential storage locations in memory on said PC Card which store said alphanumeric characters decoded from processing a barcode, and which uses said pointer and length information to retrieve from said memory on said PC Card said alphanumeric characters decoded from a barcode.

23. The process of claim 17 further comprising the step of recording a pointer to the starting address in a memory where the first character of any decoded alphanumeric data is stored and the number of sequential storage locations storing alphanumeric data, and wherein the step of transferring said alphanumeric data to said host computer comprises the steps of:

storing in a first predetermined memory location a data bit indicating that a successful decoding operation has occurred and storing said status and length information in second and third predetermined memory locations;

using said host computer to periodically said first predetermined memory location to determine if a successful decoding operation has occurred;

if a successful decoding operation has occurred, retrieving said status and length information from said second and third predetermined memory locations and accessing a memory storing said alphanumeric data starting at the location pointed to by said pointer and retrieving data from as many sequential memory locations as are pointed to by said length information.

24. The process of claim 17 further comprising the step of sensing motion in front of said barcode scanning device and applying power to said barcode scanning device so as to start barcode scanning and decoding when motion is sensed.

25. The process of claim 17 further comprising the step of offloading said decoded alphanumeric data to another computer on a local area network via a wireless or conventional local area network interface circuit built into said PC Card.

26. The process of claim 17 further comprising the step of offloading said decoded alphanumeric data to another computer via a modem built into said PC Card.

27. The process of claim 17 wherein said step of receiving undecoded data from a barcode scanning device comprises the steps of receiving an undecoded signal from a wand type barcode scanning device by performing the steps of:

(1) sampling said undecoded signal from said wand type barcode scanning device frequently enough to determine when transitions have occurred in said undecoded signal from said wand type barcode scanning device corresponding to transisitions from light to dark in a barcode being scanned by said wand type barcode scanning device;

(2) determining from said transitions in said undecoded signal from said wand type barcode scanning device the relative physical spacing between said transitions from light to to dark in said barcode being scanned by said wand type barcode scanning device;

(3) computing from said transitions in said undecoded signal from said wand type barcode scanning device the spacing ratios between said transitions from light to dark in said barcode;

(4) when enough transitions in said undecoded signal from said wand type barcode scanning device to complete an alphanumeric character encoded in said barcode have been received, decoding the information contained in the physical spacing ratios between said transitions from light to dark in said barcode into an alphanumeric character; and (5) transferring said alphanumeric character to said host computer.

28. The process of claim 27 further comprising the steps of:

determining whether the character transferred to said host computer was a stop character;

if the decoded character was not the stop character, repeating steps (1)–(5) of claim 31 for the next character and continuing to repeat steps (1)–(5) of claim 31 for all subsequent characters until all alphanumeric characters encoded in said barcode have been decoded and transferred to said host computer.

29. A process for decoding undecoded output data from a barcode scanning device into alphanumeric characters and inputting said alphanumeric characters into a host computer through a PCMCIA slot, comprising the steps of:

receiving undecoded data from a barcode scanning input device which processes a barcode;

decoding alphanumeric characters from said undecoded data and storing the alphanumeric characters in a memory on a PC Card;

transferring said alphanumeric characters to said host computer through an electrical connection to said PC card made through said PCMCIA slot;

and wherein said step of receiving undecoded data comprises the steps of:

energizing said barcode scanning input device upon receipt of a signal;

checking an input port coupled to said barcode scanning input device to determine if electrical transitions are occurring on said input port, and, if so, for sampling said input port and storing in memory a sequence of logic 1's and 0's that define the spacing between transitions between light and dark areas of a scanned barcode; and computing the ratios of run lengths of at least some of the runs of logic 1's and logic 0's and wherein said step of decoding alphanumeric character from said undecoded input data comprises the steps of:

examining said ratios of run lengths to locate start and stop characters;

determining from said start and stop characters which type of barcode was scanned;

determining the direction in which said barcode was scanned by determining whether said start or said stop character was received first; and using a code set appropriate to the barcode scanned to decode said run lengths into alphanumeric data, said code set comprised of predetermined unique combinations of run lengths that map to particular alphanumeric characters;

and further comprising the steps of: computing a checksum on the alphanumeric characters decoded from said undecoded data and comparing said checksum to a checksum encoded in said barcode to determine if said barcode was properly decoded.

30. A process for decoding undecoded output data from a barcode scanning device into alphanumeric characters and inputting said alphanumeric characters into a host computer through a PCMCIA slot, comprising the steps of:

receiving undecoded data from a barcode scanning input device which processes a barcode;

decoding alphanumeric characters from said undecoded data and storing the alphanumeric characters in a memory on a PC Card;

transferring said alphanumeric characters to said host computer through an electrical connection to said PC card made through said PCMCIA slot;

and wherein said step of receiving undecoded data comprises the steps of:

energizing said barcode scanning input device upon receipt of a signal;

checking an input port coupled to said barcode scanning input device to determine if electrical transitions are occurring on said input port, and, if so, for sampling said input port and storing in memory a sequence of logic 1's and 0's that define the spacing between transitions between light and dark areas of a scanned barcode; and computing the ratios of run lengths of at least some of the runs of logic 1's and logic 0's;

and wherein said step of decoding alphanumeric characters from said undecoded input data comprises the steps of:

examining said ratios of run lengths to locate start and stop characters;

determining from said start and stop characters which type of barcode was scanned;

determining the direction in which said barcode was scanned by determining whether said start or said stop character was received first; and using a code set appropriate to the barcode scanned to decode said ratios of run lengths into alphanumeric data, said code set comprised of predetermined unique combinations of run lengths that map to particular alphanumeric characters;

and further comprising the steps of:

filtering out any unwanted alphanumeric characters from the string of alphanumeric characters decoded from said barcode.

31. A process for decoding undecoded output data from a barcode scanning device into alphanumeric characters and inputting said alphanumeric characters into a host computer through a PCMCIA slot, comprising the steps of:

receiving undecoded data from a barcode scanning input device which processes a barcode;

decoding alphanumeric characters from said undecoded data and storing the alphanumeric characters in a memory on a PC Card;

transferring said alphanumeric characters to said host computer through an electrical connection to said PC card made through said PCMCIA slot;

and wherein said step of receiving undecoded data comprises the steps of:

energizing said barcode scanning input device upon receipt of a signal;

checking an input port coupled to said barcode scanning input device to determine if electrical transitions are occurring on said input port, and, if so, for sampling said input port and storing in memory a sequence of logic 1's and 0's that define the spacing between transitions between light and dark areas of a scanned barcode; and computing the ratios of run lengths of at least some of the runs of logic 1's and logic 0's;

and wherein said step of decoding alphanumeric characters from said undecoded input data comprises the steps of:

examining said ratios of run lengths to locate start and stop characters;

determining from said start and stop characters which type of barcode was scanned;

determining the direction in which said barcode was scanned by determining whether said start or said stop character was received first; and using a code set appropriate to the barcode scanned to decode said ratios of run lengths into a string of alphanumeric character data, said code set comprised of predetermined unique combinations of run lengths that map to particular alphanumeric characters;

and further comprising the steps of:

appending any desired suffix or prefix characters to said string of alphanumeric characters decoded from said run lengths of logic 1's and 0's.

32. A process for receiving data from an input device using a PC Card and transmitting said data to a host computer through a PCMCIA slot having a PCMCIA connector therein, comprising the steps of:

receiving one or more alphanumeric characters from an input device through a port on said PC Card;

storing said alphanumeric characters in a memory on said PC Card;

recording a pointer to the starting address in said memory of said PC Card of said one or more alphanumeric characters;

generating data that will be detected by said host computer through transactions carried out through said PCMCIA connector indicating that alphanumeric characters have been stored on said PC Card for use by said host computer and indicating where in memory said alphanumeric characters can be found;

providing access to said host computer to said alphanumeric characters stored in said memory on said PC Card when said host computer requests access; and providing access for said host computer to an expansion memory on said PC Card, said access to said expansion memory being simultaneously provided to said host computer with the process of receiving and storing data on said PC Card from said input device.

33. An interface between a host computer and an input device through a PC Card and a PCMCIA slot on said host computer having a PCMCIA connector therein, comprising:

an expansion memory on said PC Card;

means for receiving one or more alphanumeric characters from said input device through a port on said PC Card; and means for transferring said one or more alphanumeric characters to said host computer through said PCMCIA slot and PCMCIA connector; and means for providing access for said host computer to said expansion memory on said PC Card, said access to said expansion memory being provided on a time division multiplexed basis to said host computer with the process of receiving said alphanumeric characters from said input device and transferring said alphanumeric characters to said host computer.

34. An apparatus for transferring data from an input device through a PC Card and a PCMCIA slot on a host computer having a PCMCIA connector therein into said host computer through said PCMCIA connector, comprising:

a memory on said PC Card;

a communication circuit on said PC Card for receiving one or more characters in serial, parallel or ADB format or other data in any format from said input device through a port on said PC Card and storing said one or more characters in said memory and recording a pointer in the form of an address in memory where the first said character is stored and length information in the form of the number of sequential memory locations used to store all the received characters, and, if necessary, decoding said data received from said input device into alphanumeric characters and storing said alphanumeric characters in said memory, and notifying said host that one or more characters have been stored for retrieval by said host computer; and a microprocessor on said PC Card which is programmed to retrieve said characters from said memory using said pointer and length information and transfer said characters through said PCMCIA connector to a memory within said host computer.

35. The apparatus of claim 34 further comprising an input device physically and electrically coupled to said PC Card.

36. The apparatus of claim 35 wherein said input device is a charge coupled device barcode reading device.

37. The apparatus of claim 35 wherein said input device is a magnetic stripe reader.

38. The apparatus of claim 35 wherein said input device is a keyboard.

39. The apparatus of claim 35 wherein said input device is a laser-based barcode scanning device having decoded output.

40. The apparatus of claim 35 wherein said input device is a wand based barcode reader having decoded output.

41. The apparatus of claim 35 wherein said input device is a magnetic ink reader.

42. The apparatus of claim 35 wherein said input device is an optical character recognition device.

43. The apparatus of claim 35 wherein said input device is a trackball, mouse, lightpen or other pointing device.

44. A process for decoding undecoded output data from a barcode scanning device into alphanumeric characters and inputting said alphanumeric characters into a host computer through a PCMCIA slot, comprising the steps of:

receiving undecoded data from a barcode scanning input device which processes a barcode;

decoding alphanumeric characters from said undecoded data and storing the alphanumeric characters in a memory on a PC Card;

transferring said alphanumeric characters to said host computer through an electrical connection to said PC card made through said PCMCIA slot;

and further comprising the steps of supplying power to said barcode scanning device from said host computer when barcode scanning is desired and cutting off power to said barcode scanning device after a successful decoding operation.

45. A process for decoding undecoded output data from a barcode scanning device into characters in the code set of characters recognized by a host computer and inputting said decoded characters into said host computer through a PCMCIA bus connector in a PCMCIA slot on said host computer, comprising:

receiving on a PC card sized to fit into the PCMCIA slot of said host computer undecoded data from an input device, said undecoded data generated by said input device from the light and dark patterns of a barcode;

decoding said undecoded data into one or more decoded characters from a code set of characters used by said host computer, and storing said decoded characters in a first memory on said PC Card, said first memory being dedicated to storing said one or more decoded characters and other data and/or instructions needed to carry out the decoding process on said PC Card;

while said decoding process is occurring, simultaneously providing additional data and/or program storage capacity to said host computer using said PCMCIA slot in said host computer and a second memory located on said PC Card and coupled to said PCMCIA bus connector in said PCMCIA slot of said host computer while isolating said first random access memory from said PCMCIA bus connector of said host computer using a bus multiplexer;

when said one or more decoded characters stored in said first random access memory are ready to be transferred to said host computer, transferring said decoded characters to said host computer.

46. An apparatus for transferring data from an input device through a PC Card and a PCMCIA slot on a handheld host computer having a PCMCIA connector therein into said host computer through said PCMCIA connector, comprising:

a memory on said PC Card;

a communication circuit on said PC Card for receiving undecoded data in any format from said input device through a port on said PC Card, sampling said undecoded data sufficiently to generate a plurality of strings of logic 1's or logic 0's which define the information carrying attributes of said received data, and storing the sample data in said memory along with a pointer to the start of the sample data and information about the length of said sample data, and notifying said host computer that sample data from an input device has been stored on said PC Card; and a microprocessor in said host computer programmed to retrieve said sample data from said memory on said PC Card and transfer said sample data through said PCMCIA connector to a memory within said host computer, and programmed to determine automatically what type of barcode said sample data was derived from by executing an autodiscrimination routine and then decode said sample data into one or more alphanumeric characters using an algorithm appropriate to the type of data which was received from said input device.

* * * * *